United States Patent
Sehitoglu

(10) Patent No.: US 7,296,045 B2
(45) Date of Patent: Nov. 13, 2007

(54) MATRIX-VALUED METHODS AND APPARATUS FOR SIGNAL PROCESSING

(76) Inventor: Hasan Sehitoglu, 2540 Country Hills Rd., Apt. #263, Brea, CA (US) 92821-4659

(*) Notice: Subject to any disclaimer, the term of this patent is extended or adjusted under 35 U.S.C. 154(b) by 451 days.

(21) Appl. No.: 10/865,210

(22) Filed: Jun. 10, 2004

(65) Prior Publication Data

US 2006/0085497 A1    Apr. 20, 2006

(51) Int. Cl.
*G06F 17/14*    (2006.01)

(52) U.S. Cl. ........................................ 708/400

(58) Field of Classification Search ............ 708/400
See application file for complete search history.

(56) References Cited

U.S. PATENT DOCUMENTS

| | | | |
|---|---|---|---|
| 3,617,720 A | 11/1971 | Gentleman | |
| 3,965,342 A | 6/1976 | Constant | |
| 4,999,799 A | 3/1991 | Tufts | |
| 5,732,068 A | 3/1998 | Takahashi | |
| 5,790,514 A | 8/1998 | Marchok | |
| 5,818,813 A | 10/1998 | Saito | |
| 5,956,318 A | 9/1999 | Saeki | |
| 5,973,642 A | 10/1999 | Li | |
| 6,088,398 A | 7/2000 | Wahlqvist | |
| 6,151,295 A | 11/2000 | Ma | |
| 6,157,938 A | 12/2000 | An-Yeu et al. | |
| 6,175,550 B1 | 1/2001 | van Nee | |
| 6,263,356 B1 | 7/2001 | Kozaki et al. | |
| 6,304,611 B1 * | 10/2001 | Miyashita et al. | 375/260 |
| 6,356,926 B1 | 3/2002 | Andre | |
| 6,404,806 B1 | 6/2002 | Ginesi | |
| 6,430,587 B1 | 8/2002 | Orling | |
| 6,477,553 B1 | 11/2002 | Druck | |
| 6,532,484 B1 | 3/2003 | Kechriotis | |
| 6,859,816 B2 | 2/2005 | Makino et al. | |
| 6,904,445 B1 | 6/2005 | Bacher | |
| 6,938,064 B1 | 8/2005 | Jelali et al. | |
| 6,963,891 B1 | 11/2005 | Hoyle | |
| 7,024,443 B2 | 4/2006 | Davey et al. | |
| 7,062,523 B1 | 6/2006 | Hoffman et al. | |
| 2003/0152164 A1 * | 8/2003 | George | 375/316 |
| 2003/0236808 A1 * | 12/2003 | Hou | 708/400 |
| 2004/0228271 A1 * | 11/2004 | Marzetta | 370/210 |

OTHER PUBLICATIONS

Weinstein, Data Transmission by Frequency Division Multiplexing Using the Discrete Fourier Transform, 1971, IEEE Transactions on Communication, vol. Com-19, No. 5, pp. 628-634.

* cited by examiner

*Primary Examiner*—D. H. Malzahn

(57) ABSTRACT

The present invention relates to a novel matrix-valued transform framework to process digital signals. According to one aspect of the invention, matrix-valued methods and apparatus are described to transform a vector-valued discrete-time data sequence from time-domain into frequency-domain. In another aspect, matrix-valued methods and apparatus are described to transform a vector-valued data sequence from frequency-domain into time-domain. Furthermore, the new framework disclosed in this invention also provides a plurality of methods and apparatus for basic signal processing functions and operations of a matrix-valued communication system. These functions and operations include but are not limited to matrix-valued fast Fourier transformation, matrix-valued linear and circular convolution, matrix-valued correlation, matrix-valued multiplexing and de-multiplexing, and matrix-valued data coding and decoding.

3 Claims, 10 Drawing Sheets

Functional diagram of a matrix-OFDM communication system (Transmitter side).

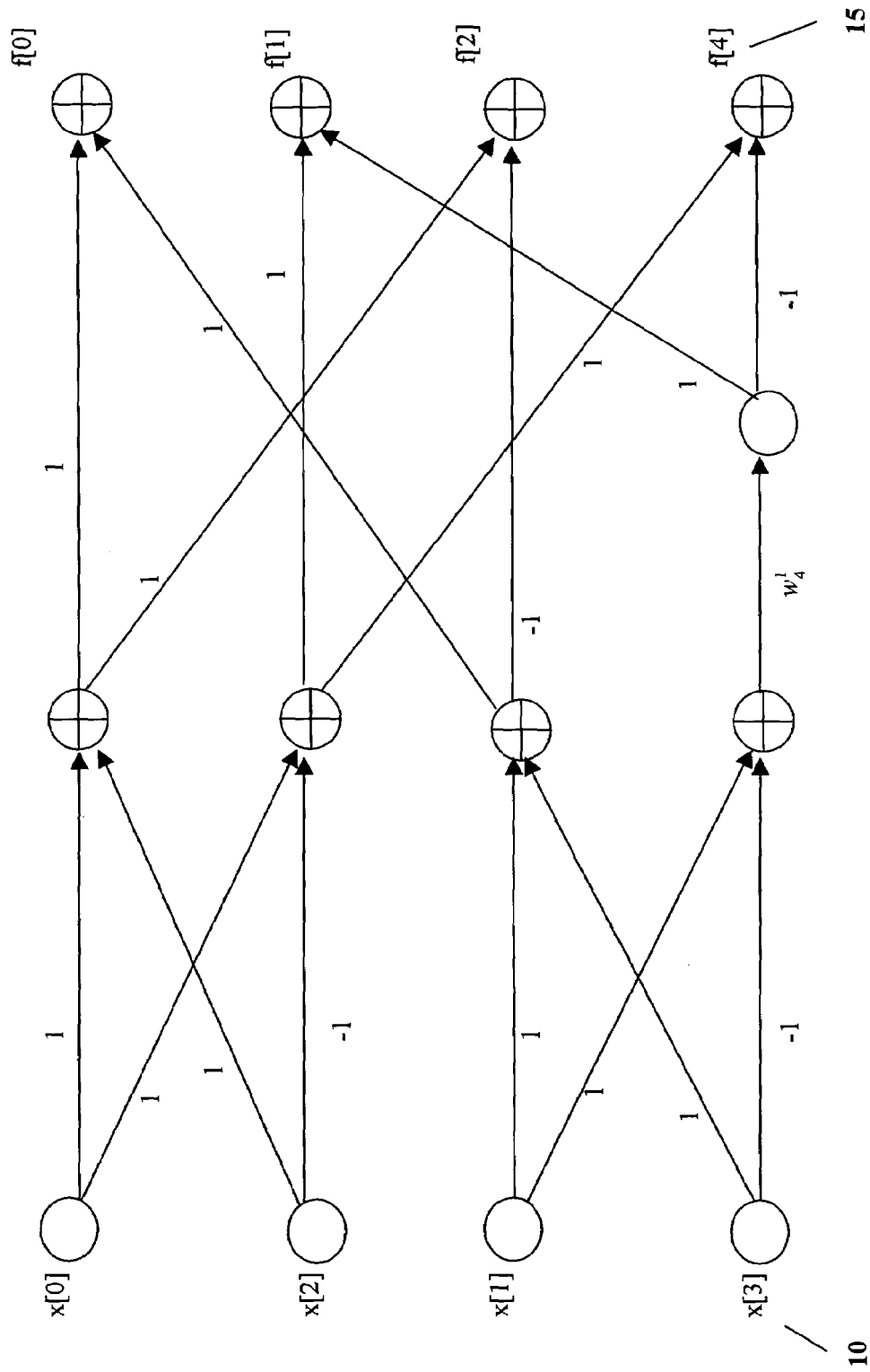
Figure 1. Signal flow diagram for a four-point decimation-in-time scalar-valued FFT processor (prior art)

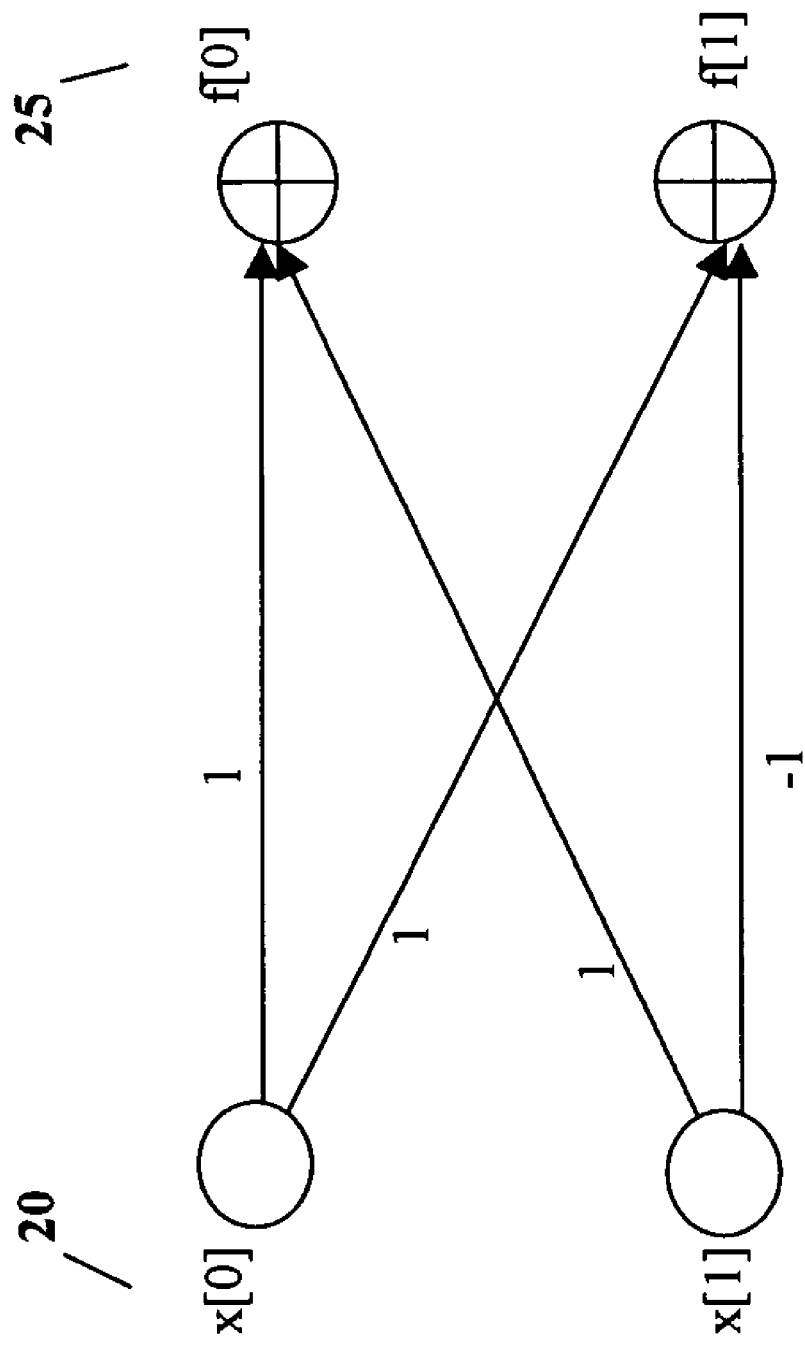
Figure 2. Butterfly diagram for a 2-point scalar-valued FFT processor (prior art).

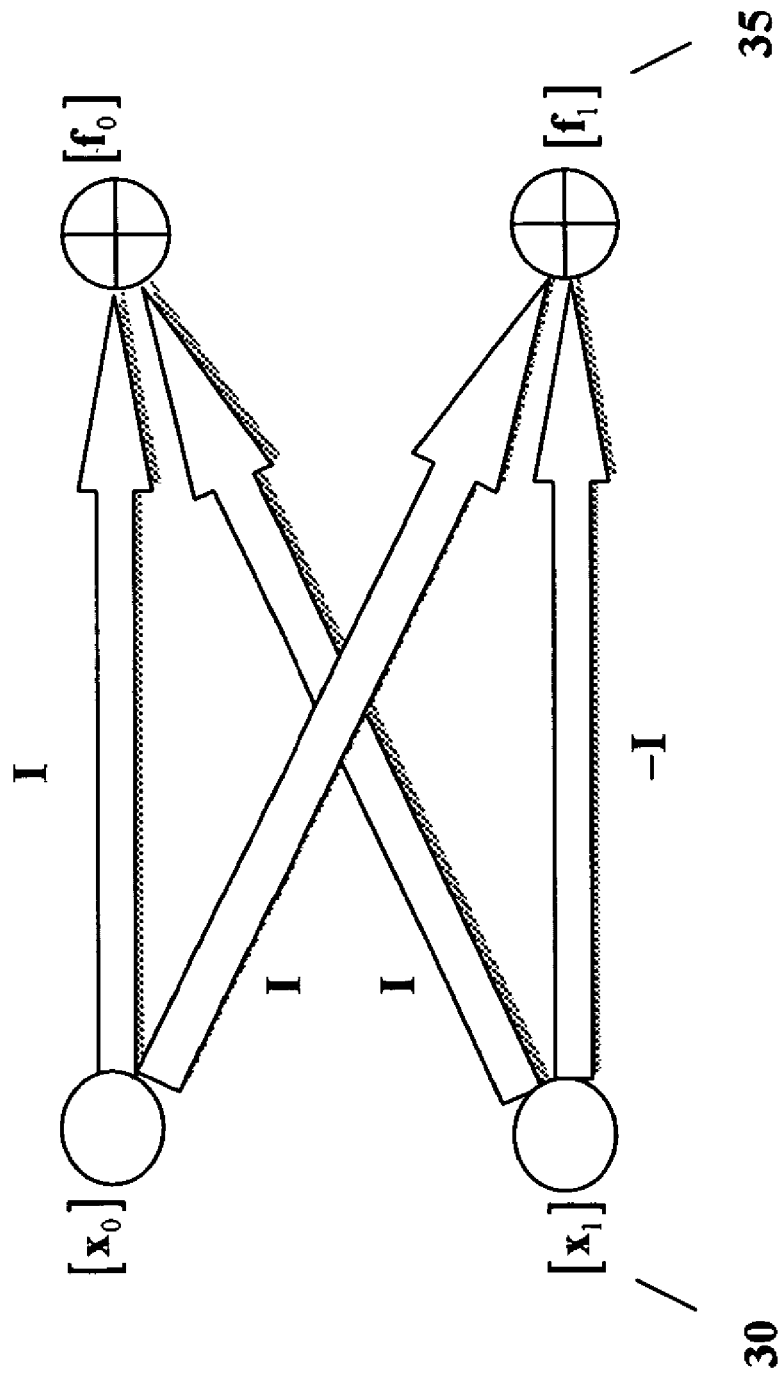
Figure 3. Butterfly diagram for a 2-vector point decimation-in-time matrix-FFT processor.

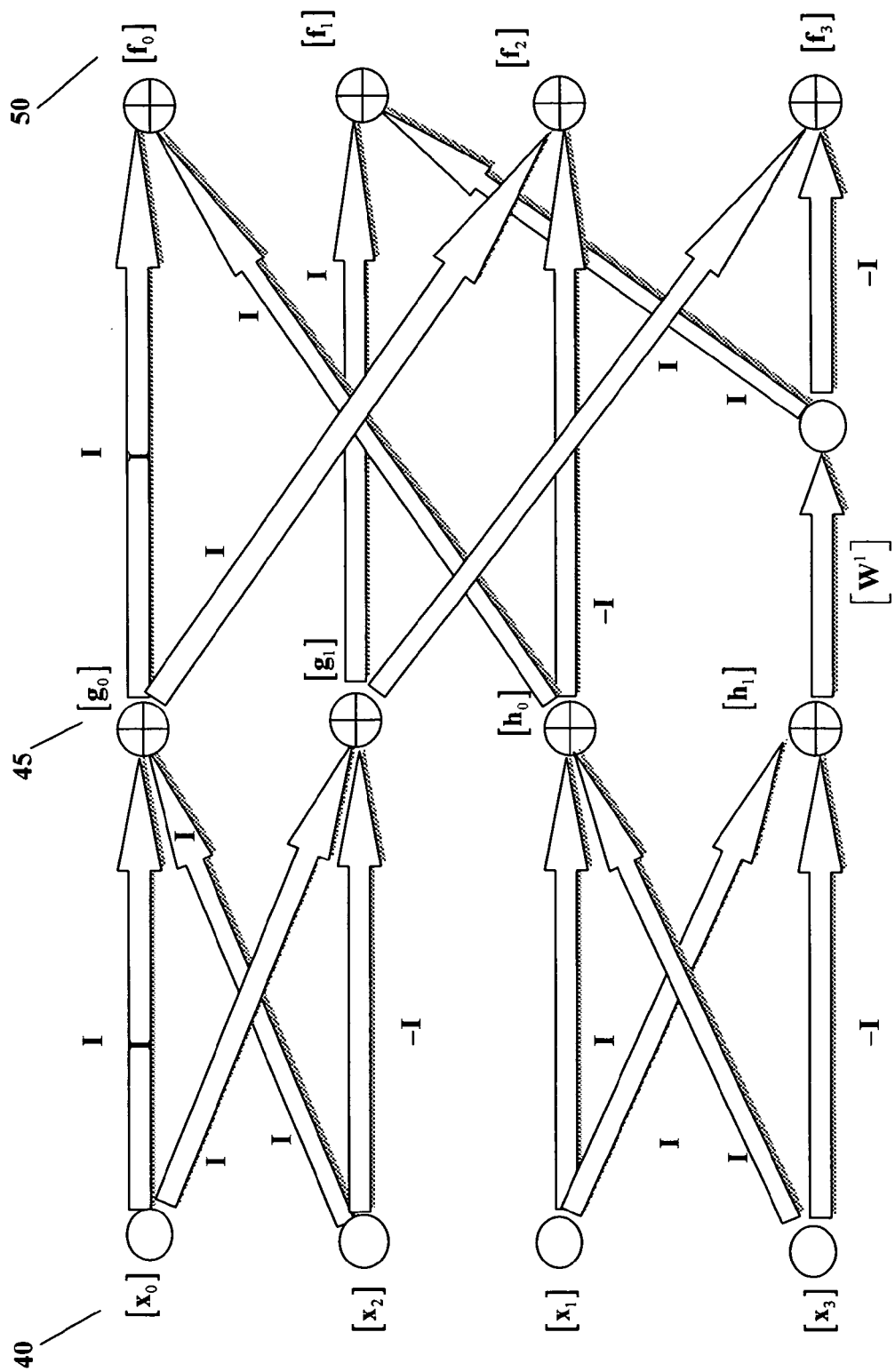
Figure 4. Signal flow diagram of a 4-vector point decimation-in-time matrix-FFT processor.

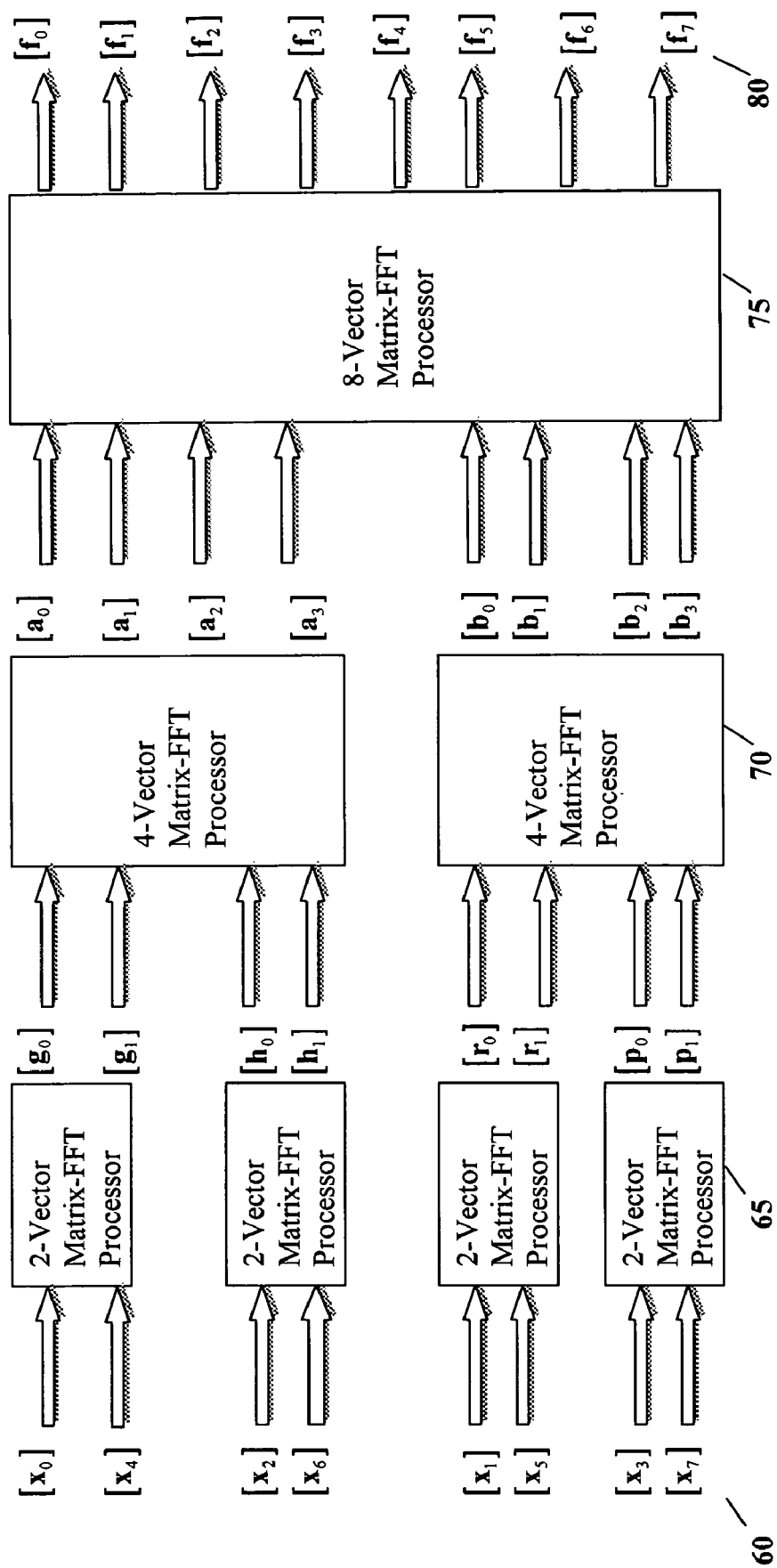
Figure 5. Signal flow diagram of an 8-vector point decimation-in-time matrix-FFT processor.

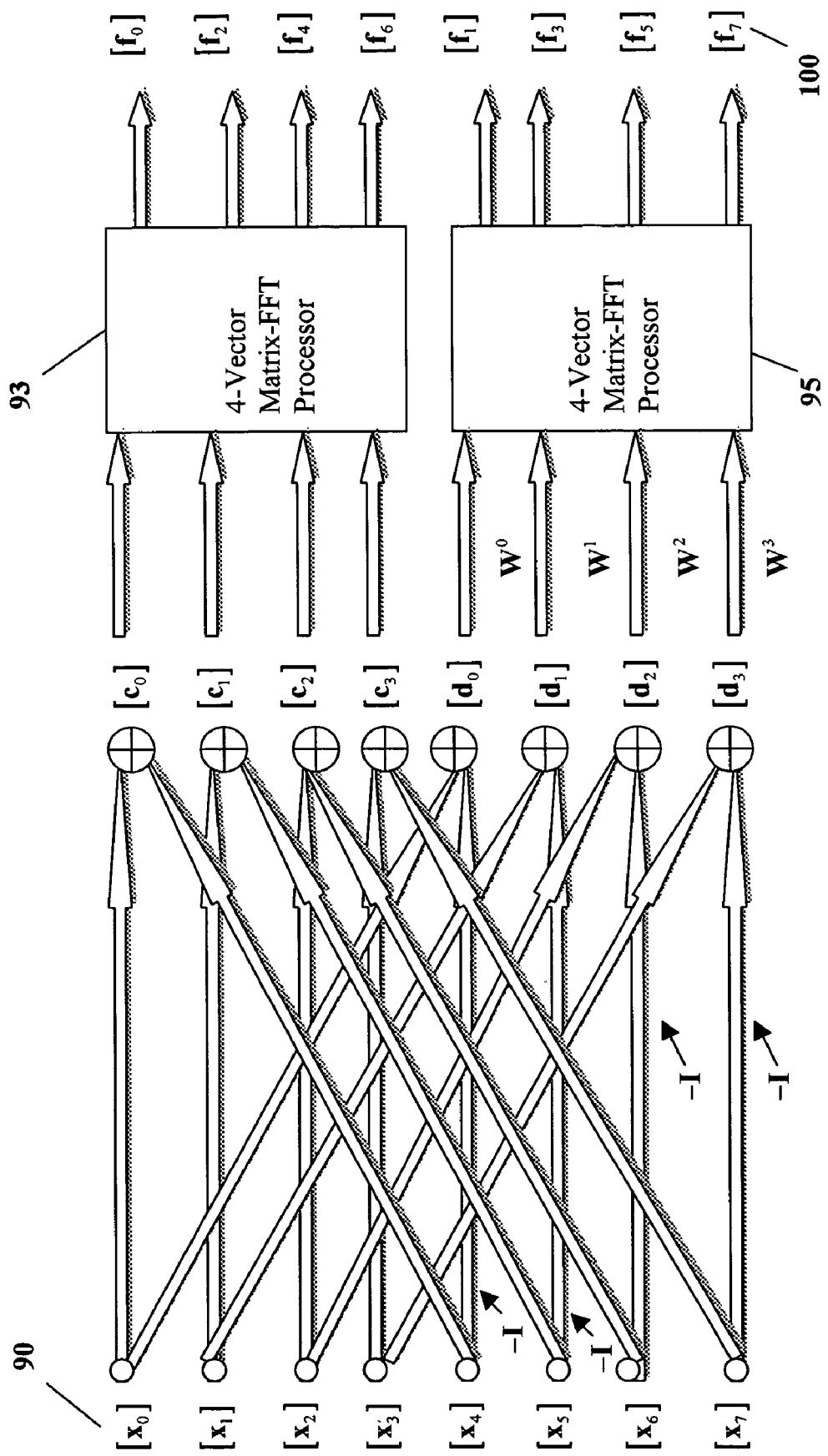
Figure 6. Signal flow diagram of an 8-vector point decimation-in-frequency matrix-FFT processor.

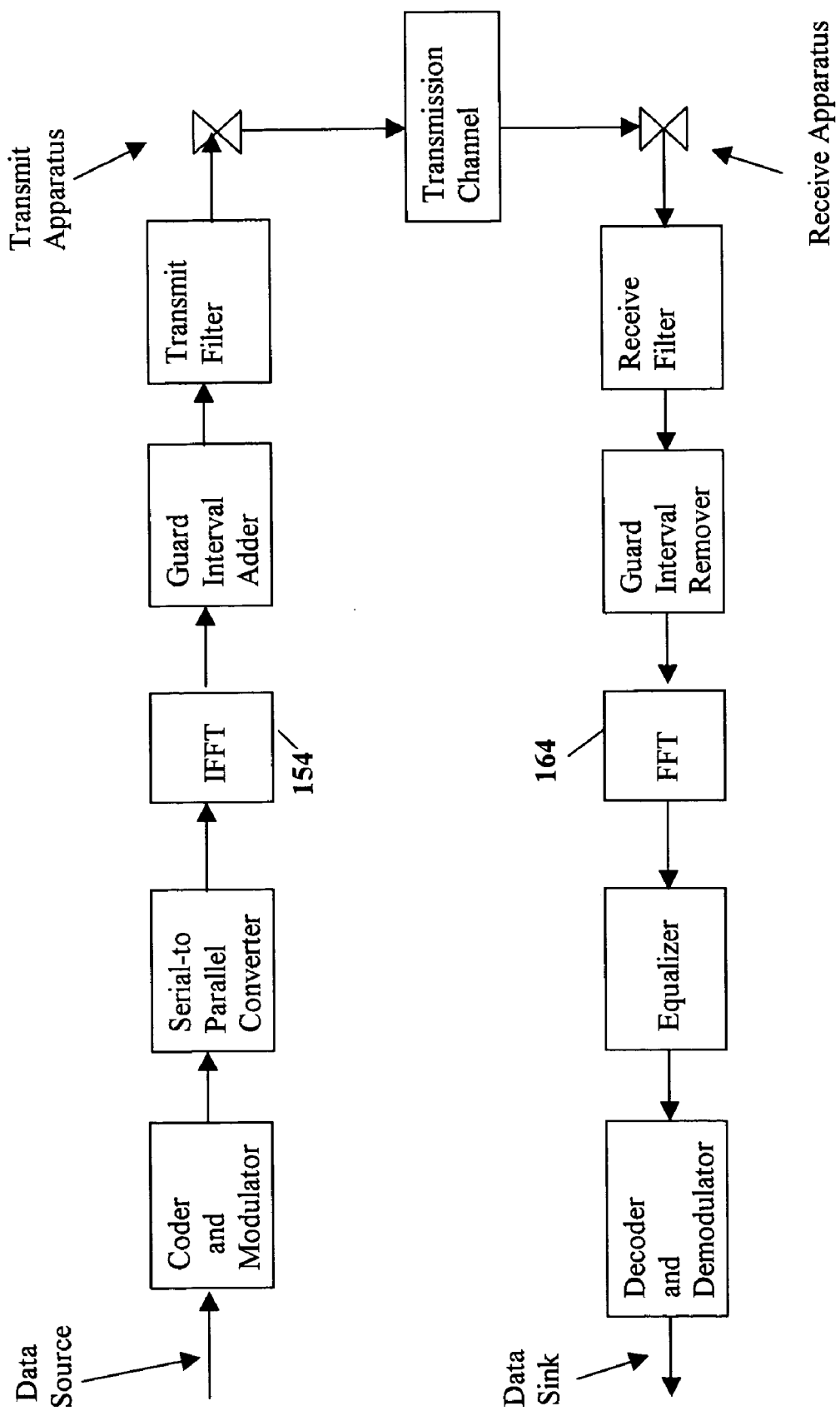
Figure 7. Functional Block Diagram of an OFDM Communication System (prior art)

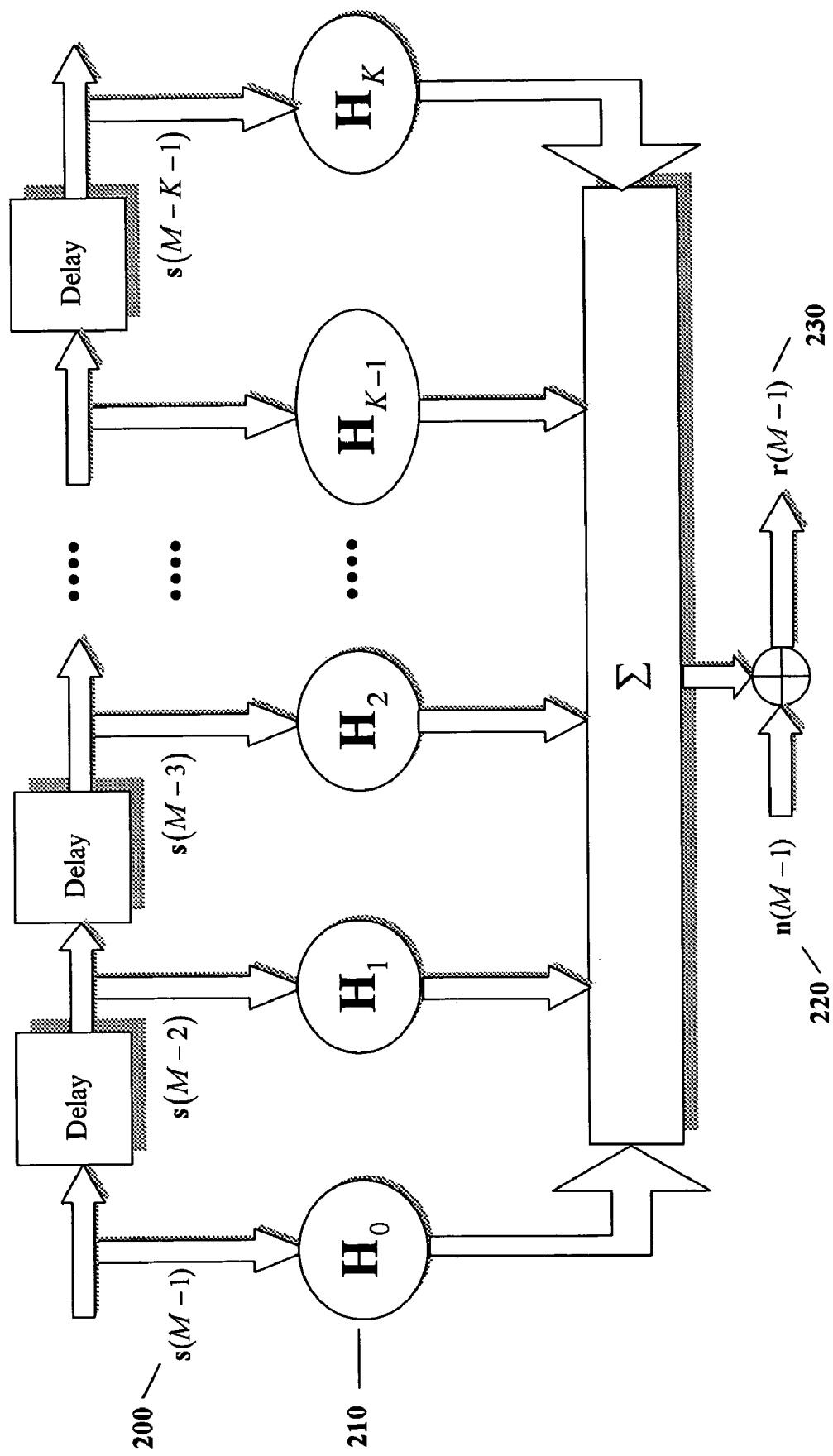
Figure 8. Matrix-valued model of a MIMO communication channel with finite impulse response

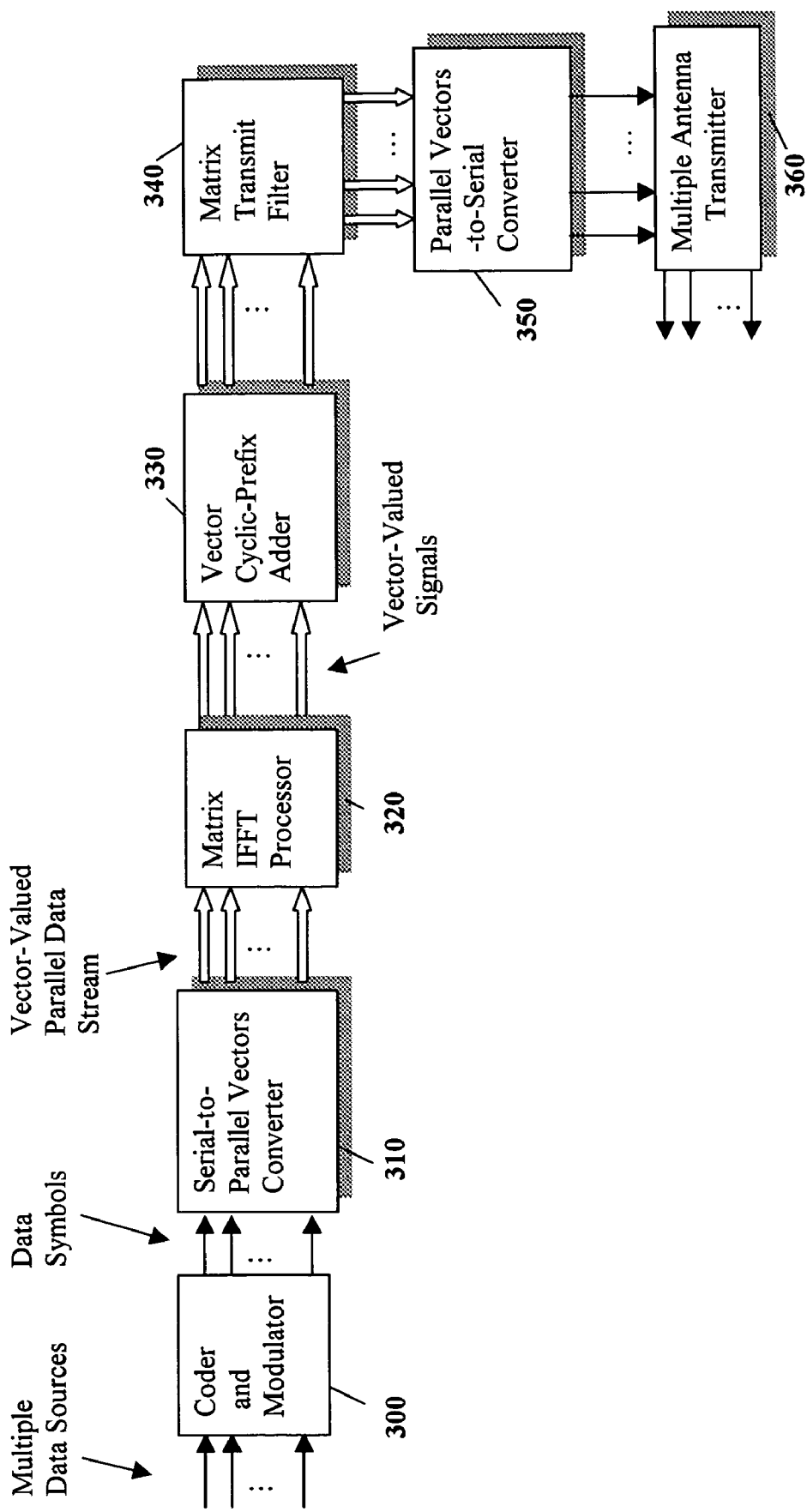
Figure 9. Functional diagram of a matrix-OFDM communication system (Transmitter side).

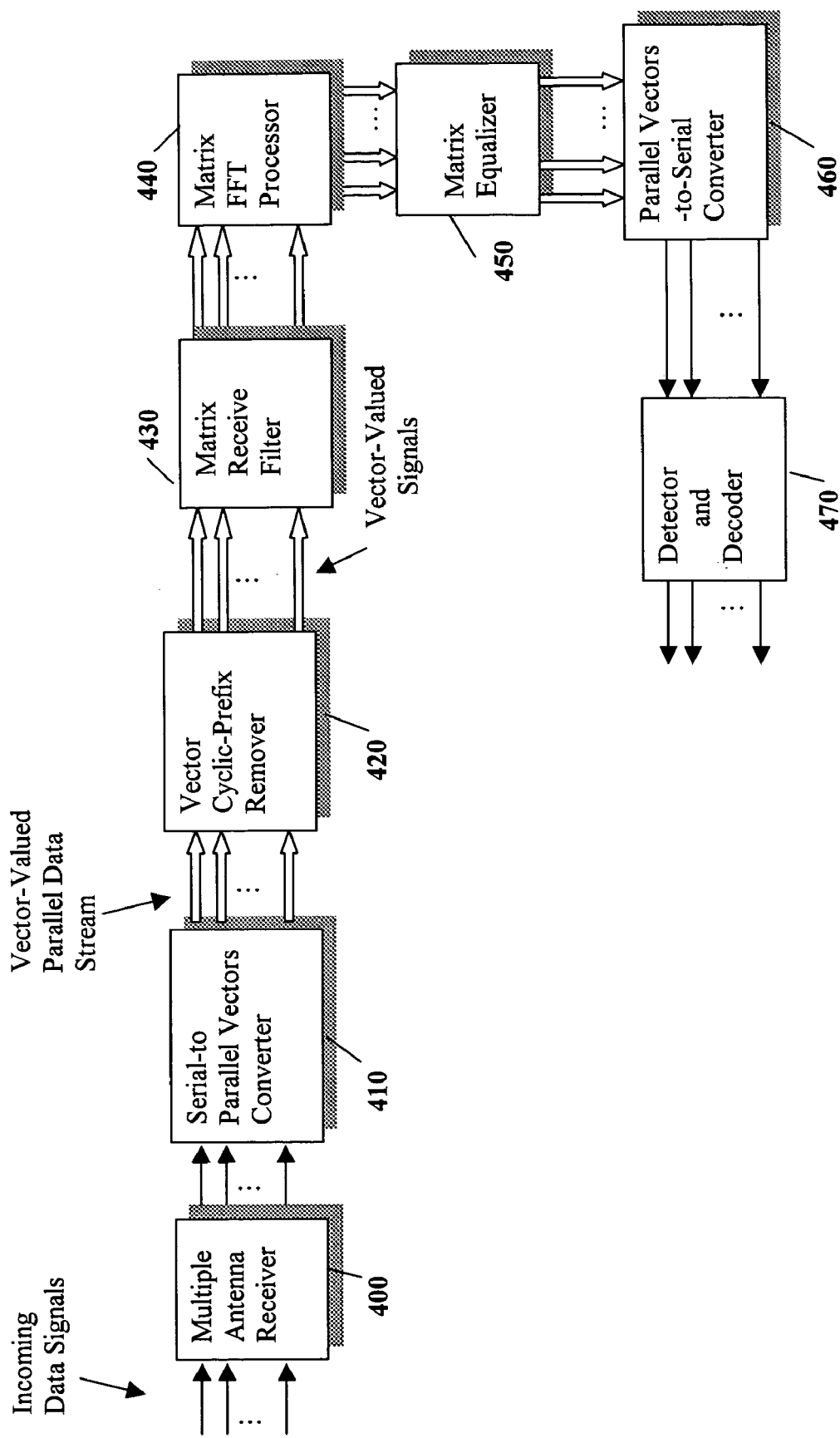
Figure 10. Functional block diagram of a matrix-OFDM communication system (Receiver side).

MATRIX-VALUED METHODS AND APPARATUS FOR SIGNAL PROCESSING

CROSS-REFERENCE TO RELATED APPLICATIONS

Not Applicable

STATEMENT RE: FEDERALLY SPONSORED RESEARCH/DEVELOPMENT

Not Applicable

Computer Program Listing Appendix

The computer program listing appendix comprises a total number of two (2) CD's, including Copy 1 Replacement which was created on Oct. 6, 2004 and Copy 2 Replacement which was created on Oct. 6, 2004, wherein the subject matter contained in the discs is herein incorporated by reference into this specification. All files on the CD are in ASCII format. The files use MATLAB program and language written for IBM PC-type computers which operate using the MS-Windows 2000 or similar operating systems. Each disc is identical to the other disc. Following is a list of each file on the CD including the name of the file, size (bytes) and the date of creation:

TABLE I

| File Name | Size | Date of Creation |
|---|---|---|
| Test_Mat_FFT2 | 526 bytes | Oct. 6, 2004 |
| M_FFT2 | 370 bytes | Oct. 6, 2004 |
| M_IFFT2 | 355 bytes | Oct. 6, 2004 |
| Matrix_Np_FFT2 | 1.35 Kbytes | Oct. 6, 2004 |
| Matrix_Np_IFFT2 | 1.45 Kbytes | Oct. 6, 2004 |

BACKGROUND OF THE INVENTION

1. Field of the Invention

The present invention relates generally to matrix-valued methods and apparatus for processing signals. More particularly, the invention relates to matrix-valued Fast Fourier Transform (FFT) and matrix-valued Inverse Fast Fourier Transform (IFFT) methods and processors.

2. Introduction and Notation

This invention deals with matrix-valued functions, variables, quantities, algorithms and systems as opposed to scalar-valued functions, variables, quantities, algorithms and systems. In order to describe these functions, variables, quantities, algorithms and systems, the following notation is adopted throughout this disclosure:

Scalar functions and variables are denoted in lower case letters (e.g. x, y, a).

Letters k, n, m, r, p, q, K, N, M are used to denote integer variables.

A vector of scalar quantities is denoted by lower case, bold letters (e.g. x, a).

A matrix of scalars is denoted by upper case, bold, Times Roman font (e.g. X, A).

A matrix of matrices is denoted by upper case, bold, Euclid font (e.g. W, H).

An identity matrix of a given size is denoted by I. That is $$I = \begin{bmatrix} 1 & 0 & \cdots & 0 \\ 0 & 1 & \cdots & 0 \\ \vdots & \vdots & \ddots & \vdots \\ 0 & 0 & \cdots & 1 \end{bmatrix}$$

A diagonal matrix with elements $$\Lambda = \begin{bmatrix} \lambda_1 & 0 & \cdots & 0 \\ 0 & \lambda_2 & \cdots & 0 \\ \vdots & \vdots & \ddots & \vdots \\ 0 & 0 & \cdots & \lambda_n \end{bmatrix}$$

is denoted by diagonal $\{\lambda_1, \lambda_2, \ldots, \lambda_n\}$.

An all-zeros matrix or vector is denoted by 0.

The symbol $(.)^\perp$ is used to denote the complex conjugate transpose of a matrix or a vector.

The symbol j is used to represent the imaginary number $\sqrt{-1}$.

|x| means norm of the vector x.

(p-m) mod M means to divide (p-m) by M and retain the remainder only.

In order to recognize the value and contributions of the present invention, it is important to understand the difference between the matrix form of an algorithm involving scalar variables and a matrix-valued algorithm involving matrix variables. Consider, for example, the following relationships between two known scalars $\{y_1, y_2\}$ and two unknown scalars $\{x_1, x_2\}$ $$a_{11}x_1^2 + a_{12}x_2^2 + b_{11}x_1 + b_{12}x_2 = y_1$$

$$a_{21}x_1^2 + a_{22}x_2^2 + b_{21}x_1 + b_{22}x_2 = y_2 \quad (1)$$

The matrix form of the above scalar-valued equations can be written as $$\begin{bmatrix} a_{11} & a_{12} \\ a_{21} & a_{22} \end{bmatrix} \begin{bmatrix} x_1^2 \\ x_2^2 \end{bmatrix} + \begin{bmatrix} b_{11} & b_{12} \\ b_{21} & b_{22} \end{bmatrix} \begin{bmatrix} x_1 \\ x_2 \end{bmatrix} = \begin{bmatrix} y_1 \\ y_2 \end{bmatrix} \quad (2)$$

or $$A \begin{bmatrix} x_1^2 \\ x_2^2 \end{bmatrix} + B \begin{bmatrix} x_1 \\ x_2 \end{bmatrix} = \begin{bmatrix} y_1 \\ y_2 \end{bmatrix} \quad (3)$$

Observe that all the matrices and vectors are scalar-valued quantities. In contrast, consider a similar relationship between two known matrices $\{Y_1, Y_2\}$ and two unknown matrices $\{X_1, X_2\}$, $$A_{11}X_1^2 + A_{12}X_2^2 + B_{11}X_1 + B_{12}X_2 = Y_1$$

$$A_{21}X_1^2 + A_{22}X_2^2 + B_{21}X_1 + B_{22}X_2 = Y_2 \quad (4)$$

The preceding matrix-valued equations can be written in a compact way as $$\begin{bmatrix} A_{11} & A_{12} \\ A_{21} & A_{22} \end{bmatrix} \begin{bmatrix} X_1^2 \\ X_2^2 \end{bmatrix} + \begin{bmatrix} B_{11} & B_{12} \\ B_{21} & B_{22} \end{bmatrix} \begin{bmatrix} X_1 \\ X_2 \end{bmatrix} = \begin{bmatrix} Y_1 \\ Y_2 \end{bmatrix} \quad (5)$$

or $$\mathcal{A} \begin{bmatrix} X_1^2 \\ X_2^2 \end{bmatrix} + \mathcal{B} \begin{bmatrix} X_1 \\ X_2 \end{bmatrix} = \begin{bmatrix} Y_1 \\ Y_2 \end{bmatrix} \quad (6)$$

Now, note that all the matrices and vectors in Eq.6 are matrix-valued objects. Although A and B of Eq.3 are matrices of scalars, A and B of Eq.6 are matrices of matrices. In other words, the fundamental mathematical unit of Eq.3 is a scalar entity whereas the fundamental mathematical unit of Eq.6 is a matrix entity. It is true that a vector of matrices (hereafter called a hyper-vector) and a matrix of matrices (hereafter called a hyper-matrix) can be treated as a matrix of scalars. However, as the dimensions of these vectors and matrices increase into the thousands, the computational methods and algorithms developed over the past centuries using the scalar framework fail to converge and as a result they yield unacceptable solutions.

On the other hand, the matrix-valued framework is particularly convenient for representations of higher-order systems with thousands of matrix-valued inputs and outputs. It is extremely efficient for finding accurate numerical solutions. Furthermore, the matrix-valued framework is a unique platform for introducing original concepts and developing new analysis and design techniques. It must be pointed out that the matrix-valued methods and algorithms are more general than those of the scalar based framework. Indeed, although the matrix-valued methods and algorithms reduce to their scalar-valued counterparts, the converse is not true. That is, the solution methods and algorithms of the scalar framework do not directly and readily extend to the realm of matrix-valued problems. For example, the concept of division is well established in the scalar domain. However, the division of two vectors or two matrices is not defined in the vector or matrix domain. Instead, the concept of matrix inverse must be used. These kinds of problems originating from a scalar perspective explain why the novel concepts and solution methods disclosed in this invention have been elusive until now.

3. Description of the Prior Art

In the prior art, serial information is processed in the form of scalar-valued signals. In such a system, a single variable function of time (discrete or continuous) is sufficient to describe how a particular characteristic of a data stream changes over a period of time. The most popular method for analyzing and solving signal processing problems is to utilize the properties of the scalar-valued Fourier transform. The Fourier transform is the main tool to represent signals in the frequency domain. To illustrate what is meant by the scalar-valued Fourier transform and emphasize the single variable nature of the prior art, consider a set of N samples of a discrete-time signal, $\{x(n), n=0,1,2, \ldots, N-1\}$. Now, the conventional discrete Fourier transform (DFT) of $x(n)$ is defined by the following expression $$f(k) = \sum_{n=0}^{N-1} x(n) e^{-j\left(\frac{2\pi k n}{N}\right)}, k = 0, 1, 2, \ldots, N-1 \quad (7)$$

where the symbol j represents the imaginary number $\sqrt{-1}$. Note that N real data values (in the time domain) transform to N complex DFT values (in the frequency domain). Likewise, given a set of N discrete-frequency samples $\{f(k),$ $k=0,1,2, \ldots, N-1\}$, the conventional inverse discrete Fourier transform (IDFT) of $f(k)$ is given by $$x(n) = \frac{1}{N} \sum_{k=0}^{N-1} f(k) e^{j\left(\frac{2\pi k n}{N}\right)}, n = 0, 1, 2, \ldots, N-1 \quad (8)$$

Since there is a common term, the above definitions are usually simplified by introducing the following symbol $$w = e^{-j\left(\frac{2\pi}{N}\right)} \quad (9)$$

Note that w is a scalar-valued quantity and it is called twiddle factor in practice. Equations (7) and (8) can then be written in terms of the twiddle factor as $$f(k) = \sum_{n=0}^{N-1} x(n) w^{kn}, k = 0, 1, 2, \ldots, N-1 \quad (10)$$

and $$x(n) = \frac{1}{N} \sum_{k=0}^{N-1} f(k) w^{-kn}, n = 0, 1, 2, \ldots, N-1 \quad (11)$$

The DFT samples defined in Eq.7 can be expressed in matrix-vector form as $$\begin{bmatrix} f(0) \\ f(1) \\ f(2) \\ \vdots \\ f(N-1) \end{bmatrix} = \begin{bmatrix} 1 & 1 & 1 & \cdots & 1 \\ 1 & w & w^2 & \cdots & w^{N-1} \\ 1 & w^2 & w^4 & \cdots & w^{2(N-1)} \\ \vdots & \vdots & \vdots & \ddots & \vdots \\ 1 & w^{N-1} & w^{2(N-1)} & \cdots & w^{(N-1)(N-1)} \end{bmatrix} \begin{bmatrix} x(0) \\ x(1) \\ x(2) \\ \vdots \\ x(N-1) \end{bmatrix} \quad (12)$$

or $$f = Fx \quad (13)$$

where x is the vector of N input samples and f is the vector of DFT transform samples and F is the N×N Fourier matrix. In a similar fashion, the IDFT relationships can be expressed in matrix-vector form as $$x = F^{-1} f \quad (14)$$

where $F^{-1}$ is the inverse of the Fourier matrix. The important role that DFT plays in the analysis, synthesis, and implementation of digital signal processing algorithms is well known to those skilled in the art. See, for example, [1] "*The Digital Signal Processing Handbook*" edited by V. K. Madisetti and D. B. Williams, a CRC handbook published in cooperation with IEEE Press, 1998, ISBN 0-8493-8572-5, and [2] "*Digital Signal Processing, A Practical Approach*" by E. C. Ifeachor and B. W. Jervis, $2^{nd}$ Edition, Prentice Hall, 2002, ISBN 0201-59619-9, which are incorporated herein by reference.

If the concept of dimension is expanded to include space, then many of the concepts and properties of DFT in one dimension can be extended to multi-dimensional signals. For example, to measure the frequency content of an image, a two-dimensional DFT analysis is employed by using the following equation $$f(k_1, k_2) = \sum_{n_1=0}^{N_1-1} \sum_{n_2=0}^{N_2-1} x(n_1, n_2) e^{-j2\pi\left(\frac{k_1 n_1}{N_1} + \frac{k_2 n_2}{N_2}\right)}, \quad (15)$$

$$0 \le k_1 \le N_1 - 1, \, 0 \le k_2 \le N_2 - 1$$

Conversion of this equation to a sequence of two one-dimensional DFT is accomplished by noting that the exponential term can be factored into two terms. However, it is important to emphasize that, even though 2-dimensional data are being processed, the transform relationship of Eq.15 is still a scalar-valued algorithm in terms of its input $x(n_1, n_2)$ and output $f(k_1, k_2)$ samples. This scalar-valued formulation is also true for higher order dimensions as in 3-dimensional video processing.

Another generalization of the DFT concept is the non-uniform discrete Fourier transform (NDFT) method. The NDFT is obtained by sampling at non-uniformly distributed frequency points. However, for large samples of data, NDFT results in ill-conditioned calculations. For further details of NDFT, please see

[3] "Non-Uniform Discrete Fourier Transform and its Signal Processing Applications" by S. Bagchi and S. K. Mitra, Kluwer Academic Publishers, Norwell Mass., 1998, which is incorporated herein by reference.

In the prior art, it is well known that a large number of multiplications and additions are required for the calculation of the DFT. For example, if N=1024, then approximately one million complex multiplications and one million complex additions are necessary. In practice, the DFT is evaluated using a fast Fourier transform (FFT) algorithm, which requires on the order of $(N \log_2 N)/2$ multiplications. This is a significant decrease in the $N^2$ multiplications required by the brute force approach. There are different versions of the FFT algorithm. An in depth treatment of the prior art FFT technology can be found in the following publications:

[4] "The Fast Fourier Transform and Its Applications" by E. O. Brigham, Prentice Hall, Englewood Cliffs, N.J., 1988, and

[5] "Handbook of Real-Time Fast Fourier Transforms" by W. W. Smith and J. M. Smith, IEEE Press, Piscataway, N.J., 1995, which are incorporated herein by reference.

For patents of interest concerning the prior art scalar-valued DFT and IDFT methods and the associated FFT technology, please see U.S. Pat. No. 3,617,720 entitled "Fast Fourier Transform Using Hierarchical Store", issued Nov. 2, 1971 to W. M. Gentleman;

U.S. Pat. No. 3,965,342 entitled "Digital FFT Processor Using Random Access Memory", issued Jun. 22, 1976 to J. N. Constant;

U.S. Pat. No. 4,999,799 entitled "Signal Processing Apparatus for Generating a Fourier Transform", issued Mar. 12, 1991 to D. W. Tufts;

U.S. Pat. No. 6,356,926 entitled "Device and Method for Calculating FFT", issued Mar. 12, 2002 to T. Andre, and U.S. Pat. No. 6,430,587 entitled "Method and Apparatus for FFT Computation", issued Aug. 6, 2002 to A. Orling.

All of the above patents are incorporated herein by reference.

FIG. 1 is a graphic representation of a prior art FFT implementation with four data values x[0]-x[3] in the input column 10 and four data values f[0]-f[3] in the output column 15. This particular implementation approach is known as the decimation-in-time FFT method. FIG. 2 shows a recurring group of decimation-in-time operations referred to as a butterfly system. Observe that a typical prior art FTT implementation is composed of a series of scalar-valued butterfly systems. In the example shown in FIG. 2, the butterfly system has two scalar values x[0] and x[1] in the input column 20 and two scalar values f[0] and f[1] in the output column 25. Therefore, this system is called a radix-2 FFT algorithm.

The scalar-valued DFT expression (see Eq.7) defines how time-domain input samples are related to the frequency-domain information. The N-point scalar-valued DFT of a finite-duration signal with length N is equal to the Fourier transform of the signal at frequencies $$f_k = \frac{k}{N} \quad 0 \le k \le N - 1 \quad (16)$$

Clearly, the scalar-valued DFT can only compute as many points in the frequency spectrum as there are available sample points. In other words, the N-point scalar-valued DFT of a discrete-time signal corresponds to a uniform sampling of the Fourier transform at N equidistant frequency-domain points. Due to this fact, the scalar-valued DFT exhibits a rigid structure when it comes to the frequency spacing. What is needed is a new DFT/FFT method that has flexibility in specifying the frequency domain parameters.

Without exception, the prior art DFT and the associated FFT technology are based on scalar-valued transform algorithms operating on scalar-valued signals and variables. However, most of the practical dynamic systems (e.g. communications and control systems) involve multiple inputs and multiple outputs (MIMO). Consider, for example, multiple transmit and multiple receive antenna elements in a wireless MIMO communications system. These systems are modeled via vector and matrix variables with dimensions in the order of several thousands. In order to analyze and synthesize MIMO systems, there is a need for a matrix-valued DFT/FFT algorithm that operates on vector and matrix-valued signals, functions and variables.

The present invention overcomes the aforementioned difficulties and limitations of the scalar-valued DFT/FFT technology and offers an original and comprehensive solution by providing a matrix-valued framework. This new platform yields matrix-valued time-to-frequency domain transformation methods and algorithms resulting in a new class of matrix-valued devices and apparatus. Further objects and advantages of the present invention will become apparent from a consideration of the figures and ensuing description.

BRIEF SUMMARY OF THE INVENTION

The present invention discloses a novel matrix-valued transform framework to process signals involving dynamic systems. To mention a few possible application areas, consider, for example, signal processing in wireless and wireline communication systems, image processing in video systems, radar and sonar processing, statistical data analysis and synthesis in engineering, scientific and economic systems. The matrix-valued platform described in this invention provides a plurality of methods and algorithms for basic functions and operations of a matrix-valued signal processing apparatus. These functions and operations include but are not limited to matrix-valued Fourier transformation, matrix-valued linear and circular convolution, matrix-valued correlation, matrix-valued modulation and demodulation, matrix-valued multiplexing and de-multiplexing, matrix-valued formatting, matrix-valued error coding and decoding, matrix-valued spectrum spreading, matrix-valued filtering of noisy signals, and matrix-valued detection.

This invention relates to signal processing, primarily digital signal processing, of vector-valued data samples to extract information for subsequent processing. According to one aspect of the invention, a matrix-valued method is described to transform a vector-valued discrete data sequence from time-domain into frequency-domain. In another aspect, a matrix-valued method is described to transform a vector-valued discrete data sequence from frequency-domain into time-domain. In order to extract information, a vector-valued sample sequence of length M is constructed from a discrete-time input data sequence of length N. Each element of the vector-valued sample sequence is a vector of dimension d×1 representing a vector-point in a multi-dimensional space. Here, the symbols M, N and d are predetermined integer numbers. The discrete-time input sequence may come from a single source collected at N number of instances or from a plurality of sources collected at M number of instances. Thus, an input vector of vectors can be assembled. This vector of vectors is called vector-valued input sequence. It is multiplied by a matrix of matrices wherein each entry is a matrix-valued exponential function. The argument of the exponential function is a d×d dimensional positive-definite symmetric real matrix. After performing a matrix-vector multiplication of the matrix of matrices and the vector of vectors, a vector-valued output sequence is obtained. This sequence of operations is called matrix-valued Fourier Transform and the reverse sequence of these operations is called matrix-valued Inverse Fourier Transform.

This invention, in another aspect, relates to a plurality of methods and apparatus to calculate quickly and efficiently the vector-valued output sequence. To achieve efficiency, the vector-valued input sequence is decomposed into successively smaller sub-sequences by computing smaller output vector of vectors with shorter lengths. Thereby, a recursive structure is obtained in which, for example, two output vector of vectors are decomposed into four shorter output vector of vectors and those are further decomposed into eight even shorter output vector of vectors. The decomposition continues in this way until it eventually reaches the stage where the lengths of output vectors are equal to two. Hence, it is possible to achieve substantial time savings in transforming vector-valued data form one domain into another. This sequence of decompositions is performed by an apparatus, which is called a matrix-valued Fast Fourier Transform processor. The reverse sequence of these operations is performed by another apparatus, which is called, a matrix-valued Inverse Fast Fourier Transform processor.

In another aspect, this invention describes additional matrix-valued methods by employing alternative kernel functions and thereby shows how to generate the other matrix-valued signal processing transforms such as the discrete cosine transform, the discrete sine transform, the discrete Hilbert transform, the discrete Hartley transform, the discrete Gabor transform, and the discrete Radon transform.

Yet, in another aspect, this invention is concerned with a plurality of methods and algorithms for transforming a vector-valued discrete-time data sequence into another vector-valued discrete-time data sequence by employing a discrete-time matrix-valued sequence in which the elements of the discrete-time matrix-valued sequence is circularly reversed in time and shifted to the right using a modulo M operation. The discrete-time matrix-valued sequence is assembled into a block circulant matrix of matrices. After performing a matrix-vector multiplication of the circulant matrix of matrices and the vector of vectors, an output vector of vectors is obtained. Furthermore, this invention also discloses how a matrix-valued circular convolution of MIMO systems can be accomplished using the fast methods and algorithms associated with the matrix-valued Fourier Transform.

In another aspect, this invention is related to the matrix-valued linear convolution of MIMO dynamic systems. In particular, the invention describes how a matrix-valued circular convolution of MIMO dynamic systems can be used to calculate the matrix-valued linear convolution and correlation for signal processing purposes.

In a further aspect, the invention relates to matrix-valued apparatus comprised of the hardware and software means for performing matrix-valued Fast Fourier Transform and matrix-valued Inverse Fast Fourier Transform algorithms.

In yet another aspect, the present invention relates to a communication system having vector-valued and orthogonal frequency division multiplexed signals generated by a matrix-valued IFFT processor. This system is comprised of:

(a) a coder and modulator apparatus for coding and modulating the incoming serial data by a predetermined modulation technique;

(b) a serial-to-parallel vectors converter module for splitting the multiple streams of serial data into parallel vector-valued data streams;

(c) a matrix-IFFT processor for performing a matrix-valued transform operation;

(d) a cyclically extended guard interval adder for repeating a copy of a predetermined number of vector samples of the symbol sequence at the beginning of the vector sequence being transmitted;

(e) a matrix-transmit filter module for filtering out the unwanted noise and frequency distortions;

(f) a parallel vectors-to-serial converter module for generating multiple streams of serial data;

(g) transmitter for converting the digital data streams into the analog domain and then up-converting the analog signals to an appropriate RF carrier frequency and launching the resulting signals from a plurality of transmission antennas;

(h) a receiver for collecting transmitted RF signals at a plurality of receive antennas and for down-converting the RF signals to the baseband-wave form and then converting the signals from analog to digital domain;

(k) a serial-to-parallel vector converter module for reading in said digital signals and holding their values at the parallel vector lines thereby splitting the received multiple streams of serial data into parallel vector-valued data streams;

(m) a vector cyclic-prefix remover module for eliminating the vector samples in guard intervals;

(n) a matrix-valued receive filter module to filter out undesired signal and interference noise;

(p) a matrix-FFT processor for performing a matrix-valued transform operation;

(q) a matrix equalizer module for determining an estimated base-band equivalent impulse response matrix of the transmission channel and for removing the effects of the transmission channel;

(r) a parallel vector-to-serial converter module for converting parallel vector-valued data streams back into multiple streams of serial data; and (s) a detector and decoder apparatus for demodulating, detecting, and decoding and thereby restoring said serial data bits to their original forms.

In a further aspect, the present invention relates to an image, video, and music data coding and decoding (CODEC) system comprising:

(a) a serial-to-parallel vectors converter module for splitting the multiple streams of source data into parallel vector-valued data streams;

(b) a processor for performing a matrix-valued discrete cosine transform operation;

(c) a quantizer module to remove the components of the transformed data that are not important to the visual appearance of the image;

(d) a processor for performing a matrix-valued inverse discrete cosine transform operation; and (e) a parallel vector-to-serial converter module for converting parallel vector-valued data streams back into multiple streams of serial data.

BRIEF DESCRIPTION OF THE DRAWINGS

Preferred embodiments of the present invention are described, by way of example and not by way of limitation, with reference to the accompanying figures, wherein;

FIG. 1 shows a functional signal flow diagram for a 4-point decimation-in-time scalar-valued FFT processor of the prior art;

FIG. 2 shows a butterfly diagram for a 2-point scalar-valued FFT processor of the prior art;

FIG. 3 shows a butterfly diagram for a 2-vector point decimation-in-time matrix-FFT processor;

FIG. 4 shows a functional signal flow diagram for a 4-vector point decimation-in-time matrix-FFT processor;

FIG. 5 shows a functional signal flow diagram for an 8-vector point decimation-in-time matrix-FFT processor;

FIG. 6 shows a functional signal flow diagram for an 8-vector point decimation-in-frequency matrix-FFT processor;

FIG. 7 shows an exemplary a scalar-valued OFDM communication system of the prior art;

FIG. 8 shows a functional signal flow diagram for a matrix-valued model of a MIMO communication channel with finite impulse response;

FIG. 9 shows a functional signal flow diagram for the transmitter side of a matrix-valued OFDM communication system; and FIG. 10 shows a functional signal flow diagram for the receiver side of a matrix-valued OFDM communication system.

DETAILED DESCRIPTION OF THE INVENTION

In the following description, for the purposes of explanation, specific details are set forth in order to provide a thorough understanding of the invention. However, it is emphasized that the invention may be practiced without these specific details. In some instances, algorithms and apparatus are depicted in functional block diagram form in order to avoid unnecessarily obscuring the invention.

1—Matrix-Valued Discrete Fourier Transform Method

The disclosure of the present invention starts with matrix-valued discrete Fourier transform method (hereafter denoted by matrix-DFT). First, consider a set of N samples of a discrete-time signal, $\{x(n), n=0,1,2, \ldots, N-1\}$, where N is a predetermined integer number. This set of samples can be expressed as a vector x of input data $$x = \begin{bmatrix} x(0) \\ x(1) \\ x(2) \\ \vdots \\ x(N-1) \end{bmatrix} \quad (17)$$

Define the following sub-vectors, each having two elements, $$x_0 = \begin{bmatrix} x(0) \\ x(1) \end{bmatrix}, x_1 = \begin{bmatrix} x(2) \\ x(3) \end{bmatrix}, \quad (18)$$

$$x_2 = \begin{bmatrix} x(4) \\ x(5) \end{bmatrix}, \ldots, x_{M-1} = \begin{bmatrix} x(N-2) \\ x(N-1) \end{bmatrix}$$

Now, the original data sequence can be expressed in terms of M samples of sub-vectors as shown below $$x = \begin{bmatrix} x_0 \\ x_1 \\ x_2 \\ \vdots \\ x_{M-1} \end{bmatrix} \quad (19)$$

where M=N/2. If N is divisible by an integer d, then it is also possible to utilize a set of sub-vectors of length d. For example, if d=3, the sub-vectors would be $$x_0 = \begin{bmatrix} x(0) \\ x(1) \\ x(2) \end{bmatrix}, x_1 = \begin{bmatrix} x(3) \\ x(4) \\ x(5) \end{bmatrix}, \quad (20)$$

$$x_2 = \begin{bmatrix} x(6) \\ x(7) \\ x(8) \end{bmatrix}, \ldots, x_{M-1} = \begin{bmatrix} x(N-3) \\ x(N-2) \\ x(N-1) \end{bmatrix}$$

Once the overall data vector is expressed as a vector of sub-vectors, it can be interpreted in one of two possible ways to represent practical circumstances:

1. The input data vector x corresponds to samples from a single source/sensor collected at N number of instances.
2. The input data vector x corresponds to samples from a plurality of sources/sensors collected at M number of instances.

In the sequel, the sub-vectors $\{x_m, m=0,1,2, \ldots, M-1\}$ of the input data vector shall be called vector-valued samples or vector points of the matrix-DFT method. Also, a vector-valued discrete sequence of length M shall be referred to as M-vector point sequence.

In what follows, unless otherwise stated, it is assumed that the length M of the vector-valued input data sequence is a power of 2, that is $M=2^\alpha$, where $\alpha$ is an integer. If this is not the case, then, by using zero-padding process, it is possible to add zero valued samples to increase the total number of data points so that M is a power of 2. Clearly, by way of mathematical induction, the algorithms disclosed in this invention can be easily generalized to the case in which the number of vector points in the data sequence is a power of any given integer r; that is $M=r^\alpha$. In the sequel, the integer r shall be called radix of the matrix-DFT method.

Now, consider an input vector x such that the number of vector points M is a power of r and M=N/d, where d is the length of each vector point. Then, the matrix-valued Discrete Fourier Transform (hereafter denoted by matrix-DFT) of the vector-valued samples $\{x_m, m=0,1,2,\ldots,M-1\}$ is expressed as follows $$f_p = \sum_{m=0}^{M-1} e^{-j\left(\frac{2\pi}{M}\Phi\right)pm} x_m \quad p = 0, 1, 2, \ldots, M-1 \tag{21}$$

where the real matrix $\Phi$ is a d×d dimensional positive-definite symmetric matrix. Note that Eq.21 transforms M real or complex vector points (in the time domain) into M complex vector-valued samples (in the frequency domain).

Similarly, consider a set of M frequency domain vector-valued samples $\{f_p, p=0,1,2,\ldots,M-1\}$. Then the matrix-valued Inverse Discrete Fourier Transform (hereafter denoted by matrix-IDFT) becomes $$x_M = \frac{1}{M}\sum_{p=0}^{M-1} e^{j\left(\frac{2\pi}{M}\Phi\right)pm} f_p \quad m = 0, 1, 2, \ldots, M-1 \tag{22}$$

The above expression determines a time domain vector-valued sequence from a given set of frequency domain vector-valued samples. The forward transform of Eq.21 is known as the analysis expression because it extracts spectrum information from the vector points $\{x_m, m=0,1,2,\ldots,M-1\}$ whereas the inverse transform of Eq.22 is known as the synthesis expression because it re-constructs the time-domain signal from its spectral information.

The matrix-DFT and matrix-IDFT algorithms can be simplified by noting that the following matrix exponential function is shared $$W = e^{-j\left(\frac{2\pi}{M}\Phi\right)} \tag{23}$$

where the matrix W is an d×d dimensional complex square matrix. Hereafter, the matrix W shall be called twiddle factor matrix. Equations (21) and (22) can then be written in terms of the twiddle factor matrix as $$f_p = \sum_{m=0}^{M-1} W^{pm} x_m \quad p = 0, 1, 2, \ldots, M-1 \tag{24}$$

and $$x_m = \frac{1}{M}\sum_{p=0}^{M-1} W^{-pm} f_p \quad m = 0, 1, 2, \ldots, M-1 \tag{25}$$

Observe that the vector-valued sequence $\{f_p, p=0,1,2,\ldots,M-1\}$ can also be thought of as the evaluation of the matrix-valued z-transform of $\{x_m, m=0,1,2,\ldots,M-1\}$ at evenly spaced points around the unit circle. A shorthand notation that shall be frequently used in the sequel with the matrix-DFT and matrix-IDFT pair is as follows $$f_p = mDFT(x_m) \tag{26}$$

and $$x_m = mIDFT(f_p) \tag{27}$$

The matrix-DFT samples of Eq.24 can be expressed in matrix-vector form as $$\begin{bmatrix} f_0 \\ f_1 \\ f_2 \\ \vdots \\ f_{M-1} \end{bmatrix} = \begin{bmatrix} I & I & I & \cdots & I \\ I & W & W^2 & \cdots & W^{M-1} \\ I & W^2 & W^4 & \cdots & W^{2(M-1)} \\ \vdots & \vdots & \vdots & \ddots & \vdots \\ I & W^{M-1} & W^{2(M-1)} & \cdots & W^{(M-1)(M-1)} \end{bmatrix} \begin{bmatrix} x_0 \\ x_1 \\ x_2 \\ \vdots \\ x_{M-1} \end{bmatrix} \tag{28}$$

in which the symbol I represents the d×d dimensional identity matrix. The compact form of the above equation becomes $$f = Wx \tag{29}$$

where W is the dM×dM Fourier transformation matrix of the matrix-DFT algorithm. Note that W is a hyper-matrix, that is, it is a matrix of matrices. In a similar fashion, the matrix-IDFT relationship can be expressed in matrix-vector form as $x = W^{-1}f$.

It is easy to observe a few facts about W. The first obvious result is the fact that the hyper-matrix W is symmetric. Secondly, it has orthogonal matrix-valued columns. Therefore, the inverse of W can be directly found from its complex conjugate transpose as shown below.

$$W^{-1} = \frac{1}{M} W^{\perp} \tag{30}$$

where the symbol $\perp$ is used to denote the complex conjugate transpose operation. As a result, there is no need to use time-consuming matrix inversion algorithms to determine the inverse of W.

Validity of the matrix-DFT: It will now be established that matrix discrete Fourier transform is valid; that is, given M discrete vector points of $\{x_m, m=0,1,2,\ldots,M-1\}$, the forward transform results in M discrete vector points of $\{f_p, p=0,1,2,\ldots,M-1\}$. If these M vectors are substituted in the inverse transform, then the original M vectors are obtained. To show the validity of the matrix-DFT, first substitute the analysis equation into the synthesis equation.

$$x_m = \frac{1}{M}\sum_{p=0}^{M-1} W^{-pm} \left[\sum_{k=0}^{K-1} W^{pk} x_k\right] \tag{31}$$

Note that the summation variable m of the analysis equation has been changed to k to avoid confusion with m of the synthesis equation. Next, the order of the summation is reversed:

$$x_m = \frac{1}{M}\sum_{k=0}^{K-1}\sum_{p=0}^{M-1} W^{p(k-m)} x_k \quad (32)$$

Recall that the twiddle factor matrix is an exponential function with positive-definite matrix-valued argument. Now, by applying the discrete version of the orthogonality property of the complex exponential functions, it can be shown that $$\sum_{p=0}^{M-1} W^{p(k-m)} = \begin{cases} MI, & \text{if } k = m \\ 0, & \text{if } k \neq m \end{cases} \quad (33)$$

Consequently, Eq.32 becomes $$x_m = \frac{1}{M}\sum_{k=0}^{K-1} Mx|_{m=k} = x_m \quad (34)$$

and the validity of the matrix-DFT is proved.

Diagonal form of the matrix-DFT: The matrix-valued argument Φ of the exponential function in the twiddle factor matrix is the most important element in the matrix-DFT algorithm. Since Φ is a real positive-definite symmetric matrix, its eigenvalues are all real and positive and its eigenvectors are linearly independent. Consequently, Φ can be reduced by similarity to a diagonal matrix even if it has repeated eigenvalues. In short, it is possible to write $\Phi = T\Lambda_{101}T^{-1}$ where $\Lambda_\Phi$ is the diagonal matrix of eigenvalues of Φ

$$\Lambda_\Phi = \begin{bmatrix} \lambda_1 & 0 & \cdots & 0 \\ 0 & \lambda_2 & \cdots & 0 \\ \vdots & \vdots & \ddots & \vdots \\ 0 & 0 & \cdots & \lambda_r \end{bmatrix} \quad (35)$$

The similarity transformation matrix T is constructed by using the eigenvectors of Φ. In view of this spectral decomposition of Φ, the matrix-DFT expression can be written as $$f_p = T\sum_{m=0}^{M-1} e^{-j(\frac{2\pi}{M}\Lambda_\Phi)pm} T^{-1}x_m \quad p = 0, 1, 2, \cdots, M-1 \quad (36)$$

After introducing two new vector variables as $$z_m = T^{-1}x_m \text{ and } h_p = T^{-1}f_p \quad (37)$$

the matrix-DFT assumes its diagonal form $$h_p = \sum_{m=0}^{M-1} e^{-j(\frac{2\pi}{M}\Lambda_\Phi)pm} z_m \quad p = 0, 1, 2, \cdots, M-1 \quad (38)$$

It is important to note that the selection of the eigenvalues of Φ and the total number of data points must be coordinated in order to obtain accurate matrix-DFT results. Computer simulations have shown that some combinations of the eigenvalues and total number of data points may not yield correct matrix-DFT results. To gain further insight, consider a 2×2 dimensional case $$\Lambda_\Phi \square \begin{bmatrix} \lambda_1 & 0 \\ 0 & \lambda_2 \end{bmatrix} = \begin{bmatrix} 1 & 0 \\ 0 & 3 \end{bmatrix} \quad (39)$$

As $0 \leq p \leq M-1$ and $0 \leq m \leq M-1$, the first eigenvalue is associated with frequency components that repeat 0,1, 2, . . . up to M−1 times. On the other hand, the second eigenvalue increases the frequency denomination by a factor of three relative to the first eigenvalue. Therefore, the second eigenvalue controls frequency components that repeat 0,3, 6, . . . up to 3(M−1) times. It is seen that the eigenvalues of Φ represent how much relative weight is attached to each element of the vector samples. For this reason, the matrix Φ shall be called the frequency-weighting matrix of the matrix-DFT algorithm.

It is important to observe that dimensions of the twiddle factor matrix W or its frequency-weighting matrix Φ are not physical space dimensions. The term 'dimension' as used herein is an abstract mathematical concept. The notion of spatial dimension in the realm of matrix-DFT is discussed next.

Space dimension and the matrix-DFT: The basic matrix-DFT method can be extended to two-dimensional and higher dimensional spatial transforms. Consider a two-dimensional vector-valued spatial data sequence $\{x_{m_1,m_2}, 0 \leq m_1 < M_1, 0 \leq m_2 < M_2\}$, where $M_1$ is the horizontal period and $M_2$ is the vertical period. In this case, the spatial matrix-DFT is given by $$f_{p_1,p_2} = \sum_{m_2=0}^{M_2-1}\sum_{m_1=0}^{M_1-1} e^{-j\left[\left(\frac{2\pi}{M_1}\Phi_1\right)p_1m_1 + \left(\frac{2\pi}{M_2}\Phi_2\right)p_2m_2\right]} x_{m_1,m_2} \quad (40)$$

$$0 \leq p_1 < M_1, \quad 0 \leq p_2 < M_2$$

where $\Phi_1$ and $\Phi_2$ are the horizontal and vertical frequency-weighting matrices. If $\Phi_1$ and $\Phi_2$ are two commuting matrices, then it is possible to further simplify the two-dimensional spatial matrix-DFT by employing the property that the exponential of a matrix sum is a product of matrix exponentials. In this particular case, a two-dimensional spatial matrix-DFT can be expressed as a sequence of one-dimensional matrix-DFTs as shown below $$f_{p_1,p_2} = \sum_{m_2=0}^{M_2-1} e^{-j\left(\frac{2\pi}{M_2}\Phi_2\right)p_2 m_2} \sum_{m_1=0}^{M_1-1} e^{-j\left(\frac{2\pi}{M_1}\Phi_1\right)p_1 m_1} x_{m_1,m_2} \quad (41)$$

$$0 \leq p_1 < M_1, \quad 0 \leq p_2 < M_2$$

Clearly, the above developments can be easily extended to multi-dimensional matrix-DFTs involving higher dimensional vector-valued spatial data sequences.

Linearity of the matrix-DFT: Linearity means that the output of the matrix-DFT for the sum of two vector-valued signals is exactly the same as summing the matrix-DFT outputs of two individual input signals. This property is demonstrated below $$g_p = \sum_{m=0}^{M-1} W^{pm}(x_m + y_m) = \sum_{m=0}^{M-1} W^{pm} x_m + \sum_{m=0}^{M-1} W^{pm} y_m = f_p + h_p \quad (42)$$

Periodicity of the matrix-DFT: Now, it is shown that matrix-DFT is periodic with period M. This important property may be established if the pth vector point of the matrix-DFT is compared with the (p+M)th vector point. Hence, start with $$f_{p+M} = \sum_{m=0}^{M-1} e^{-j\left(\frac{2\pi}{M}\Phi\right)(p+M)m} x_m = \sum_{m=0}^{M-1} e^{-j\left(\frac{2\pi}{M}\Phi\right)Mm} e^{-j\left(\frac{2\pi}{M}\Phi\right)pm} x_m \quad (43)$$

Since $$W^M = e^{-j\left(\frac{2\pi}{M}\Phi\right)M} = e^{-j(2\pi\Phi)} = I = W^0 \quad (44)$$

Eq. 43 becomes $$f_{p+M} = \sum_{m=0}^{M-1} e^{-j\left(\frac{2\pi}{M}\Phi\right)pm} x_m = f_p. \quad (45)$$

The fact that $f_{p+M} = f_p$ shows that the matrix-DFT is periodic with period M.

Power calculation using the matrix-DFT: The power associated with a vector-valued sequence $\{x_m, m=0,1, 2, \ldots, M-1\}$ can be easily computed if it has been transformed by a matrix-DFT into its frequency components. First, consider the multiplication of the frequency-domain vector f by its complex conjugate transpose $$f^\perp f = x^\perp W^\perp W x = M(x^\perp W^{-1} W x) = M(x^\perp x) \quad (46)$$

or $$\frac{1}{M} \sum_{p=0}^{M-1} |f_p|^2 = \sum_{m=0}^{M-1} |x_m|^2 \quad (47)$$

Thus, the above equation confirms that the sum of the magnitudes of the matrix-DFT vector points divided by M is equal to the power of the vector-valued discrete signal.

2—Matrix-Valued Fast Fourier Transform Methods and Processors

It is easy to observe that a large number of matrix and vector-valued multiplications and additions are required for the calculation of the matrix-DFT. For a 4-vector point matrix-DFT, the analysis expression is given by $$f_p = \sum_{m=0}^{3} W^{pm} x_m \quad p = 0, 1, 2, 3 \quad (48)$$

Since $W = e^{-j\left(\frac{2\pi}{M}\Phi\right)}$, this expands to $$f_p = e^{-j\left(\frac{\pi}{2}\Phi\right)p \cdot 0} x_0 + e^{-j\left(\frac{\pi}{2}\Phi\right)p \cdot 1} x_1 + e^{-j\left(\frac{\pi}{2}\Phi\right)p \cdot 2} x_2 + e^{-j\left(\frac{\pi}{2}\Phi\right)p \cdot 3} x_3, \quad (49)$$

$$0 \leq p \leq 3$$

The above equation contains 4 terms on the right side. Each term consists of a multiplication of a matrix exponential term, which is always complex, by another vector term, which is real or complex. Each of the product terms is added together. Consequently, there are four complex matrix-vector multiplications and three complex vector additions to be computed. In general, an M-vector point matrix-DFT will have M complex matrix-vector multiplications and M−1 complex vector additions. Also, there are $0 \leq p \leq 3$ harmonic components. Thus, a 4-vector point matrix-DFT requires $4^2 = 16$ complex matrix-vector multiplications and $4 \times 3 = 12$ complex vector additions. In general, for an M-vector point matrix-DFT, these totals become $M^2$ and M(M−1) respectively. Since the amount of matrix and vector-valued computation and hence the computation time, is approximately proportional to $M^2$, it is clear that the number of arithmetic operations required to determine the matrix-DFT by the brute force method becomes very large for large values of M. For this reason, computational algorithms that reduce the number of matrix-vector multiplications and additions are of significant interest in practice. Notice that the amount computational load is considered in terms of matrix-vector algebra as required by the matrix-DFT algorithm. However, recall that each data point in matrix-DFT is a vector of length d. Thus, the length of each vector point must be taken into account when the actual amount of load for a matrix-DFT is evaluated.

The efficiency of the matrix-DFT can be improved substantially because the twiddle factor matrix has the following special properties.

1—Symmetry property: $W^{p(M-m)} = (W^{pm})^\perp$

2—Periodicity property: $W^{pm} = W^{p(M+m)} = W^{(p+M)m}$.

Moreover, it is also possible to take advantage of the fact that, for certain values of the integer product pm, the matrix sine and cosine functions take on the matrix values I or 0 thereby eliminating the need for multiplications. However, special operations like these still do not eliminate the amount of matrix and vector valued computation that is approximately proportional to $M^2$. Fortunately, the special properties of the twiddle factor matrix make it possible to achieve significant reductions in computational load as described below.

Description of a decimation-in-time matrix-FFT processor: This section describes the basic divide-and-conquer algorithm that leads to a matrix-valued decimation-in-time fast Fourier transform processor (hereafter denoted matrix-FFT). This algorithm is first presented for the case when M is a power of two. Such algorithms shall be called radix-2 matrix algorithms. A similar algorithm is also derived for the case when M is a power of three (i.e. radix-3 matrix algorithms). By mathematical induction, the disclosed algorithm can be generalized to the processors when M is a power of any integer. Start with the matrix-DFT analysis expression:

$$f_p = \sum_{m=0}^{M-1} W^{pm} x_m \quad 0 \le p \le M-1 \quad (50)$$

First, note that the summation can be broken into two sets of the vector-valued input data sequence $\{x_m, m=0,1, 2, \ldots, M-1\}$: (1) a first sum over the even-indexed points and (2) a second sum over the odd-indexed points. This results in $$f_p = \left\{ e^{-j\left(\frac{2\pi}{M}\Phi\right)p^0} x_0 + e^{-j\left(\frac{2\pi}{M}\Phi\right)p^2} x_2 + \right. \quad (51)$$
$$e^{-j\left(\frac{2\pi}{M}\Phi\right)p^4} x_4 + \ldots + e^{-j\left(\frac{2\pi}{M}\Phi\right)p(M-2)} x_{(M-2)} \right\} +$$
$$\left\{ e^{-j\left(\frac{2\pi}{M}\Phi\right)p^1} x_1 + e^{-j\left(\frac{2\pi}{M}\Phi\right)p^3} x_3 + e^{-j\left(\frac{2\pi}{M}\Phi\right)p^5} x_5 + \right.$$
$$\left. \ldots + e^{-j\left(\frac{2\pi}{M}\Phi\right)p(M-1)} x_{(M-1)} \right\}$$

or $$f_p = \sum_{q=0}^{\frac{M}{2}-1} e^{-j\left(\frac{2\pi}{M}\Phi\right)p(2q)} x_{2q} + \sum_{q=0}^{\frac{M}{2}-1} e^{-j\left(\frac{2\pi}{M}\Phi\right)p(2q+1)} x_{(2q+1)} \quad (52)$$

At this point, two simple algebraic manipulations are applied so that recursive nature of the matrix-DFT summation becomes evident.
1—Consider the two sums of Eq.52 and associate the factor of two in the exponents (2q) with the M in the denominator of
2—Break the exponent in the second sum into the product of two exponents. This operation factors out the one that does not depend on index q.

After performing these algebraic manipulations, Eq.52 can be written as $$f_p = \sum_{q=0}^{\frac{M}{2}-1} e^{-j\left(\frac{2\pi}{\frac{M}{2}}\Phi\right)pq} x_{(2q)} + e^{-j\left(\frac{2\pi}{M}\Phi\right)p} \sum_{q=0}^{\frac{M}{2}-1} e^{-j\left(\frac{2\pi}{\frac{M}{2}}\Phi\right)pq} x_{(2q+1)} \quad (53)$$

Observe that each of the summations is a matrix-DFT of length M/2. Thus, in shorthand notation, the matrix-DFT is written as $$f_p = mDFT_{M/2}\{x_{(2q)}\} + e^{-j\left(\frac{2\pi}{M}\Phi\right)p} mDFT_{M/2}\{x_{(2q+1)}\} \quad (54)$$

The above formulation reconstructs $f_p$ from two (but shorter length) matrix-DFTs. The recursive algorithm involved in the matrix-DFT calculations can be summarized as follows: assemble and compute two smaller matrix-DFTs and then multiply the matrix-DFT results of the odd-indexed vector points by the exponential matrix $$e^{-j\left(\frac{2\pi}{M}\Phi\right)p}.$$

When this recursive structure is adopted, the two M/2-vector point matrix-DFTs are decomposed into four M/4-vector point matrix-DFTs, and those are further decomposed into eight M/8-vector point matrix-DFTs. Since M is assumed to be a power of two, this decomposition continues until it finally reaches the stage where the matrix-DFT lengths are equal to two. Altogether, there will be η stages of matrix-valued computation, where $\eta = \log_2 M$. When the thatrix-DFT length is two (i.e. 2-vector point matrix-DFT), the computational load simply reduces to the following algorithm $$f_0 = x_0 + x_1 \quad (55)$$
$$f_1 = x_0 + e^{-j(\pi\Phi)} x_1$$

An apparatus, in which the matrix-DFT algorithm is based on decomposing the input vector sequence into successively smaller sub-sequences, shall be called a decimation-in-time matrix-FFT processor.

It is important to keep in mind the fact that a matrix-FFT algorithm is not an approximation of the matrix-DFT. On the contrary, all matrix-FFT algorithms are mathematically equivalent to the matrix-DFT. In otherwords, the computational savings are not made at the expense of accuracy.

The matrix-FFT algorithm can be completely implemented in software, in hardware or in both software and hardware. A typical software implementation of the matrix-FFT and matrix-IFFT algorithms are is presented in the form of computer source code files both presented in the Appendix at the end of this specification and on the accompanying CD's. As described in the Computer Program Listing Appendix, the aforementioned software implementation of the matrix-FFT and matrix-IFFT algorithms are herein incorporated by reference, which include the following files:

TABLE 1

| File Name | Size | Date of Creation |
|---|---|---|
| Test_Mat_FFT2 | 526 bytes | Oct. 6, 2004 |
| M_FFT2 | 370 bytes | Oct. 6, 2004 |
| M_IFFT2 | 355 bytes | Oct. 6, 2004 |
| Matrix_Np_FFT2 | 1.35 Kbytes | Oct. 6, 2004 |
| Matrix_Np_IFFT2 | 1.45 Kbytes | Oct. 6, 2004 |

The files use the MATLAB programming language to implement the matrix-FFT and matrix-IFFT decimation-in-time algorithms. Those of ordinary skill in the art will appreciate that while this implementation has been described by using the MATLAB programming language, other programming languages can also be utilized without affecting the functionality of the implementation. It is to be understood that the intent of these files is to demonstrate how matrix-FFT and matrix-IFFT algorithms work. These files have not been optimized in terms of speed and programming structure.

The purpose of the following embodiments is to illustrate the potential forms in which the present invention can occur.

First Illustrative Embodiment: This embodiment describes how an efficient decimation-in-time matrix-FFT processor can be implemented for cases in which the number of vector-valued samples is a power of 2. For demonstration purposes, the frequency-weighting matrix of the transformation is chosen to be a diagonal matrix as shown below $$\Phi \begin{bmatrix} \lambda_1 & 0 \\ 0 & \lambda_2 \end{bmatrix} = \begin{bmatrix} 1 & 0 \\ 0 & 1 \end{bmatrix} \quad (56)$$

Consider a 2-vector point matrix-DFT application, that is M=2. Suppose that the following vector points define the input data sequence.

$$x_0 = \begin{bmatrix} x(0) \\ x(1) \end{bmatrix} \text{ and } x_1 = \begin{bmatrix} x(2) \\ x(3) \end{bmatrix} \quad (57)$$

In this case, the twiddle factor matrix is $W=e^{-j(\pi 1)}=-I$. Therefore, the 2-vector point matrix-DFT algorithm becomes $$f_0 = x_0 + x_1$$

$$f_1 = x_0 - x_1$$

Note that a 2-vector point matrix-FFT processor requires two vector additions. But, no vector multiplications are involved. The signal flow graph of FIG. 3 illustrates the process for computing the 2-vector point decimation-in-time matrix-FFT. Because of the shape of the flow graph, this process is referred to as matrix-butterfly computation. In the example shown in FIG. 3, the matrix butterfly processor has two vector points [$x_0$] and [$x_1$] in the input column 30 and two vector points [$f_0$] and [$f_1$] in the output column 35.

Second Illustrative Embodiment: Now, a 4-vector point decimation-in-time matrix-FFT processor is described. Assume that the input data vectors are as follows $$x_0 = \begin{bmatrix} x(0) \\ x(1) \end{bmatrix}, x_1 = \begin{bmatrix} x(2) \\ x(3) \end{bmatrix}, x_2 = \begin{bmatrix} x(4) \\ x(5) \end{bmatrix}, x_3 = \begin{bmatrix} x(6) \\ x(7) \end{bmatrix} \quad (59)$$

Clearly, a 4-vector point matrix-DFT can be computed by using two 2-vector point matrix-FFTs. Referring to the matrix-butterfly processor, the first stage produces the following matrix-FFT results $$g_0 = x_0 + x_2 \quad (60)$$
$$g_1 = x_0 - x_2$$

$$h_0 = x_1 + x_3 \quad (61)$$
$$h_1 = x_1 - x_3$$

In this case, the twiddle factor matrices of the second stage are $$W^{0p} = e^{-j(\frac{\pi}{2}I)0p} = I \quad (62)$$

$$W^{1p} = e^{-j(\frac{\pi}{2}I)1p} = (-j)^p I$$

$$W^{2p} = e^{-j(\frac{\pi}{2}I)2p} = (-1)^p I$$

$$W^{3p} = e^{-j(\frac{\pi}{2}I)3p} = (-1)^p W^{1p}$$

Therefore, the elements of a typical 4-vector point matrix-FFT become $$f_0 = g_0 + h_0 \quad (63)$$

$$f_1 = g_1 + W^1 h_1$$

$$f_3 = g_0 - h_0$$

$$f_4 = g_1 - W^1 h_1$$

Once again, the algorithm requires two vector additions and no vector multiplications are needed. The signal flow graph for a 4-vector point decimation-in-time matrix-FFT processor can be seen in FIG. 4. In the example shown in FIG. 4, the matrix-FFT processor has four vector points [$x_0$], [$x_1$], [$x_2$] and [$x_3$] in the input column 40. The middle column 45 has [$g_0$], [$g_1$], [$h_0$] and [$h_1$], which represent the intermediate vector results. There are four vector points [$f_0$], [$f_1$], [$f_2$] and [$f_3$] in the output column 50.

Third Illustrative Embodiment: Now, an 8-vector point decimation-in-time matrix-FFT processor is illustrated using the following input data vectors $$x_0 = \begin{bmatrix} x(0) \\ x(1) \end{bmatrix}, x_1 = \begin{bmatrix} x(2) \\ x(3) \end{bmatrix}, \cdots, x_7 = \begin{bmatrix} x(14) \\ x(15) \end{bmatrix} \quad (64)$$

The 8-vector point matrix-FFT can be found by the re-composition of two 4-vector point matrix-FFTs. Referring to the results of a typical 4-vector point matrix-FFT, assume the second stage outputs are $\{a_0,a_1,a_2,a_3\}$ and $\{b_0, b_1, b_2, b_3\}$. Then, third stage of the 8-vector point matrix-FFT produces $$f_0 = a_0 + W^0 b_0 \quad (65)$$

$$f_1 = a_1 + W^1 b_1$$

$$f_2 = a_2 + W^2 b_2$$

$$f_3 = a_3 + W^3 b_3$$

$$f_4 = a_0 - W^0 b_0$$

$$f_5 = a_1 - W^1 b_1$$

$$f_6 = a_2 - W^2 b_2$$

$$f_7 = a_3 - W^3 b_3$$

where the twiddle factor matrices are given by $$W^0 = I \quad (66)$$

$$W^1 = e^{-j(\frac{\pi}{4}I)}$$

$$W^2 = e^{-j(\frac{2\pi}{4}I)}$$

$$W^3 = e^{-j(\frac{3\pi}{4}I)}$$

FIG. 5 illustrates the signal flow graph for an 8-vector point decimation-in-time matrix-FFT processor. In the example shown in FIG. 5, the matrix-FFT processor has 8 vector points [$x_0$]-[$x_7$] in the input column 60. Column 65 represents the first stage, which employs four separate 2-vector point matrix-FFT processors. Furthermore, column 70 represents the second stage, which employs two separate 4-vector point matrix-FFT processors. Finally, the third stage 75 results in eight vector points [$f_0$]-[$f_7$] in the output column 80. Since there are M/2 matrix-butterflies per stage and $\eta=\log_2 M$ stages, in general, the total number of matrix-valued multiplications is given by M/2 $\log_2$ M.

Fourth Illustrative Embodiment: In this embodiment, a different frequency-weighting matrix is used. This time, the chosen frequency matrix has distinct eigenvalues $$\Phi \Box \begin{bmatrix} \lambda_1 & 0 \\ 0 & \lambda_2 \end{bmatrix} = \begin{bmatrix} 1 & 0 \\ 0 & 3 \end{bmatrix} \tag{67}$$

Note that the algorithmic results of the first illustrative embodiment are still applicable here. But, the definitions of the twiddle factor matrices change. For a 2-vector point matrix-FFT, the twiddle factor matrix is $W=e^{-j(\pi\Phi)}=-I$. Similarly, the twiddle factor matrices of the second stage of a 4-point matrix-FFT become $$W^{0p} = I \tag{68}$$
$$W^{1p} = e^{-j(\frac{\pi}{2}\Phi)1p}$$
$$W^{2p} = e^{-j(\frac{\pi}{2}\Phi)2p}$$
$$W^{3p} = e^{-j(\frac{\pi}{2}\Phi)3p}$$

In the case of an 8-vector point matrix-FFT processor, the twiddle factor matrices are given by $$W^0 = I \tag{69}$$
$$W^1 = e^{-j(\frac{\pi}{4}\Phi)}$$
$$W^2 = e^{-j(\frac{2\pi}{4}\Phi)}$$
$$W^3 = e^{-j(\frac{3\pi}{4}\Phi)}$$

Description of a radix-3 decimation-in-time matrix-FFT processor: This section describes a decimation-in-time matrix-FFT processor for the case when M is a power of three (radix-3 matrix algorithm). Again, consider the standard matrix-DFT expression, namely, $$f_p = \sum_{m=0}^{M-1} W^{pm} x_m \quad 0 \le p \le M-1 \tag{70}$$

Observe that, in this case, the summation can be broken into three sets: (1) a first sum over the set of points indexed by $\{0,3,6,9,12,\ldots\}$, (2) a second sum over the set of points indexed by $\{1,4,7,10,13,\ldots\}$, and (3) a third sum over the set of points indexed by $\{2,5,8,11,14,\ldots\}$. This operation results in $$f_p = \{e^{-j(\frac{2\pi}{M}\Phi)p0}x_0 + e^{-j(\frac{2\pi}{M}\Phi)p3}x_3 + \tag{71}$$
$$e^{-j(\frac{2\pi}{M}\Phi)p6}x_6 + \ldots + e^{-j(\frac{2\pi}{M}\Phi)p(M-3)}x_{(M-3)}\} +$$
$$\{e^{-j(\frac{2\pi}{M}\Phi)p1}x_1 + e^{-j(\frac{2\pi}{M}\Phi)p4}x_4 + e^{-j(\frac{2\pi}{M}\Phi)p7}x_7 + \ldots +$$

-continued
$$e^{-j(\frac{2\pi}{M}\Phi)p(M-2)}x_{(M-2)}\} + \{e^{-j(\frac{2\pi}{M}\Phi)p2}x_2 + e^{-j(\frac{2\pi}{M}\Phi)p5}x_5 +$$
$$e^{-j(\frac{2\pi}{M}\Phi)p8}x_8 + \ldots + e^{-j(\frac{2\pi}{M}\Phi)p(M-1)}x_{(M-1)}\}$$

In summation form, the matrix-DFT becomes $$f_p = \sum_{q=0}^{\frac{M}{3}-1} e^{-j(\frac{2\pi}{M}\Phi)p(3q)} x_{3q} + \tag{72}$$
$$\sum_{q=0}^{\frac{M}{3}-1} e^{-j(\frac{2\pi}{M}\Phi)p(3q+1)} x_{(3q+1)} + \sum_{q=0}^{\frac{M}{3}-1} e^{-j(\frac{2\pi}{M}\Phi)p(3q+2)} x_{(3q+2)}$$

Next, algebraic manipulations are performed to extract the recursive property of the matrix-DFT summation. After these manipulations, Eq.72 can be written as $$f_p = \sum_{q=0}^{\frac{M}{3}-1} e^{-j(\frac{2\pi}{M/3}\Phi)pq} x_{(3q)} + \tag{73}$$
$$e^{-j(\frac{2\pi}{M}\Phi)p} \sum_{q=0}^{\frac{M}{3}-1} e^{-j(\frac{2\pi}{M/3}\Phi)pq} x_{(3q+1)} + e^{-j(\frac{2\pi}{M}\Phi)2p} \sum_{q=0}^{\frac{M}{3}-1} e^{-j(\frac{2\pi}{M/3}\Phi)pq} x_{(3q+2)}$$

Note that each of the summations is a matrix-DFT of length M/3 Thus, in shorthand notation, the matrix-DFT summation is as follows $$f_p = mDFT_{M/3}\{x_{(3q)}\} + \tag{74}$$
$$e^{-j(\frac{2\pi}{M}\Phi)p} mDFT_{M/3}\{x_{(3q+1)}\} + e^{-j(\frac{2\pi}{M}\Phi)2p} mDFT_{M/3}\{x_{(3q+2)}\}$$

The above formulation states that frequency-domain information $f_p$ can be obtained from three (but shorter length) matrix-DFTs. When this recursive structure is adopted, the three M/3-vector point matrix-DFTs are decomposed into nine M/9-vector point matrix-DFTs, and those are further decomposed into twenty seven M/27-vector point matrix-DFTs. Because M is a power of three, this decomposition will continue until it eventually reaches the stage where the matrix-DFT lengths are equal to three. As a result, $\eta$ stages of matrix-valued computation are required, where $\eta=\log_3 M$. A 3-vector point matrix-FFT processor implements the following algorithm $$f_0 = x_0 + x_1 + x_2 \tag{75}$$
$$f_1 = x_0 + e^{-j(\frac{2\pi}{3}\Phi)}x_1 + e^{-j(\frac{2\pi}{3}2\Phi)}x_2$$
$$f_2 = x_0 + e^{-j(\frac{2\pi}{3}2\Phi)}x_1 + e^{-j(\frac{2\pi}{3}4\Phi)}x_2.$$

The above set of equations represent a 3-vector point matrix butterfly computation.

Description of a decimation-in-frequency matrix-FFT processor: The algorithm that results in the decimation-in-frequency matrix-FFT processor is similar to that of decimation-in-time matrix-FFT processor disclosed earlier. Both of these processors require the same number of complex matrix multiplications to compute. To proceed with the description of the decimation-in-frequency matrix-FFT processor, recall the standard matrix-DFT equation:

$$f_p = \sum_{m=0}^{M-1} W^{pm} x_m \quad 0 \le p \le M-1 \tag{76}$$

Let M be a power of two, in which case M/2 is an integer. Thus, vector samples separated by M/2 in the data sequence can be grouped to divide the summation in half.

$$f_p = \sum_{m=0}^{\frac{M}{2}-1} \left[ W^{pm} x_m + W^{p\left(m+\frac{M}{2}\right)} x_{\left(m+\frac{M}{2}\right)} \right] \tag{77}$$

or $$f_p = \sum_{m=0}^{\frac{M}{2}-1} W^{pm} \left[ x_m + W^{p\frac{M}{2}} x_{\left(m+\frac{M}{2}\right)} \right] \tag{78}$$

The above expression can be simplified because $$W^{p\frac{M}{2}}$$

takes on specific matrix values as $0 \le p \le M-1$. This can be seen from $$W^{p\frac{M}{2}} = e^{-j\left(\frac{2\pi}{M}\Phi\right)p\frac{M}{2}} = e^{-j\pi p \Phi} \tag{79}$$

For example, if the frequency-weighting matrix is given by $$\Phi = \begin{bmatrix} 1 & 0 \\ 0 & 1 \end{bmatrix} \tag{80}$$

then $$W^{p\frac{M}{2}} = e^{-j\pi pI} = (-1)^p I = \begin{cases} I & \text{if } p \text{ is even} \\ -I & \text{if } p \text{ is odd} \end{cases} \tag{81}$$

First, consider even values of p and set $$p = 2q \quad q = 0, 1, 2, \ldots, \left(\frac{M}{2}-1\right) \tag{82}$$

and let $$y_m = \left[ x_m + e^{-j\pi 2q\Phi} x_{\left(m+\frac{M}{2}\right)} \right] \tag{83}$$

Now, the summation for even-numbered matrix-DFT coefficients becomes $$f_{2q} = \sum_{m=0}^{\frac{M}{2}-1} W^{2qm} y_m = \sum_{m=0}^{\frac{M}{2}-1} (W^2)^{qm} y_m \tag{84}$$

Observe that the right hand side of the above expression is an $$\frac{M}{2}$$

-vector point matrix-DFT because $$W^2 = e^{-j\left(\frac{2\pi}{M/2}\Phi\right)} \tag{85}$$

and also because the new input data sequence is $$\left\{ y_m, 0 \le m \le \frac{M}{2} - 1 \right\}.$$

In short, if the input sequence is defined by $y_m$, then it is possible to reduce matrix-DFT inputs by a factor of 2 for even values of p. Thus, it is concluded that an $$\frac{M}{2}$$

-vector point matrix-DFT can be applied to transform the input sequence defined by $y_m$.

Next, the summation for odd-numbered matrix-DFT coefficients is considered. Let $$p = 2q+1 \quad q = 0, 1, 2, \ldots, \left(\frac{M}{2}-1\right) \tag{86}$$

and introduce $$v_m = \left[ x_m + e^{-j\pi(2q+1)\Phi} x_{\left(m+\frac{M}{2}\right)} \right] \tag{87}$$

Now, the matrix-DFT summation can be written as $$f_{2q+1} = \sum_{m=0}^{\frac{M}{2}-1} W^{(2q+1)m} y_m \tag{88}$$

$$= \sum_{m=0}^{\frac{M}{2}-1} (W^2)^{qm} W^m v_m$$

$$= \sum_{m=0}^{\frac{M}{2}-1} (W^2)^{qm} z_m$$

in which $z_m = W^m v_m$. It is clear that the right hand side of the preceding equation is an M/2-vector point matrix-DFT for the new input data sequence $$\left\{z_m, 0 \leq m \leq \frac{M}{2} - 1\right\}.$$

Fifth Illustrative Embodiment: This embodiment demonstrates the implementation of the decimation-in-frequency matrix-FFT processor when M=8. Let the frequency-weighting matrix be $$\Phi = \begin{bmatrix} 1 & 0 \\ 0 & 1 \end{bmatrix} \tag{89}$$

First, start with the input sample vectors $$x_0 = \begin{bmatrix} x(0) \\ x(1) \end{bmatrix}, x_1 = \begin{bmatrix} x(2) \\ x(3) \end{bmatrix}, \ldots, x_7 = \begin{bmatrix} x(14) \\ x(15) \end{bmatrix} \tag{90}$$

Next, add the following pairs of the input column 90 ($x_0$ and $x_4$), ($x_1$ and $x_5$), ($x_2$ and $x_6$), and finally ($x_3$ and $x_7$) as shown in FIG. 6. This operation reduces the number of terms by a factor of 2 so that a 4-vector point matrix-FFT processor 93 can be applied. In a similar fashion, subtract these input pairs and multiply by the twiddle factor matrices $w^0$, $W^1$, $W^2$, $W^3$. Thus, a second 4-vector point matrix-FFT processor 95 is employed. At this point, the parameter $W^2$ needs to be determined for a 4-vector point matrix-FFT. When M=8, Eq.85 becomes $$W^2 = e^{-j\left(\frac{2\pi}{4}I\right)} = -jI \tag{91}$$

The procedure for the 8-vector point decimation-in-frequency matrix-FFT processor can be easily repeated for a 4-vector point decimation-in-frequency matrix-FFT processor. The signal flow diagram of the resulting processor can be seen in FIG. 6.

It will be apparent to those skilled in the art that matrix-FFT algorithms disclosed herein may be obtained by other means and ways without departing from the spirit of essential characteristics thereof. For example, it is possible to employ Kronecker or tensor product expansions and various matrix factorization methods to arrive at a matrix-FFT algorithm with mixed or split radix.

3—Matrix-Valued Discrete Cosine Transform Method

The discrete cosine transform is used frequently in music, image and video coding and decoding (CODEC) applications because of its superior energy compaction ability. This section discloses a matrix-valued discrete cosine transform method (hereafter denoted by matrix-DCT) by the use of the matrix-DFT. Consider a length-M vector sequence $\{x_m, m=0,1,2,\ldots,M-1\}$ First, the input data sequence is extended to a length 2M by zero-valued vector padding:

$$\bar{x}_m = \begin{cases} x_m & 0 \leq m \leq M-1 \\ 0 & M \leq m \leq 2M-1 \end{cases} \tag{92}$$

Next, a new sequence of length-2M is formed from Eq.92 according to the formula $$y_m = \bar{x}_m + \bar{x}_{(2M-1-m)} \quad 0 \leq m \leq M-1 \tag{93}$$

and its 2M-point matrix-DFT is computed as follows $$h_p = \sum_{m=0}^{2M-1} W^{pm} y_m \quad 0 \leq p \leq 2M-1 \tag{94}$$

Then, the M-point matrix-DCT of $\{x_m, m=0,1,2,\ldots,M-1\}$ is given by $$c_p = \begin{cases} W^{\left(\frac{p}{2}\right)} h_p & 0 \leq p \leq M-1 \\ 0 & \text{otherwise} \end{cases} \tag{95}$$

Recall that a complex matrix exponential function has matrix cosine and sine components. Accordingly, the matrix-DCT coefficients can be expressed in simplified form as $$c_p = 2\sum_{m=0}^{M-1} \cos\left[\left(\frac{\pi}{2M}\Phi\right)(2m+1)p\right] x_m \quad 0 \leq p \leq M-1 \tag{96}$$

Note that the matrix-DCT coefficients of a real vector sequence are real. On the other hand, the matrix-DFT coefficients of a real vector sequence are always complex.

To derive the matrix-valued inverse DCT of an M-point coefficient sequence $\{c_p, p=0,1,2,\ldots,M-1\}$, first a 2M-point matrix-DFT is formed according to $$h_p = \begin{cases} W^{\left(-\frac{p}{2}\right)} c_p & 0 \leq p \leq M-1 \\ 0 & p = M \\ -W^{\left(-\frac{p}{2}\right)} c_{2M-p} & M+1 \leq p \leq 2M-1 \end{cases} \tag{97}$$

and its 2M-point matrix-IDFT is computed as $$y_m = \frac{1}{2M} \sum_{p=0}^{2M-1} W^{-pm} h_p \quad 0 \leq m \leq 2M-1 \tag{98}$$

Then, the M-point matrix-IDCT of $\{c_p, p=0,1,2,\ldots,M-1\}$ is given by $$x_m = \begin{cases} y_m & 0 \leq m \leq M-1 \\ 0 & \text{otherwise} \end{cases} \tag{99}$$

Using the matrix cosine component of the complex exponential function, the matrix-IDCT relationship can be written in a more explicit form as $$x_m = \begin{cases} \dfrac{1}{M}\sum_{p=0}^{M-1} A_k \cos\left[\left(\dfrac{\pi}{2M}\Phi\right)(2m+1)p\right]c_p & 0 \le m \le M-1 \\ 0 & \text{otherwise} \end{cases} \quad (100)$$

in which the matrix coefficient $A_k$ is given by $$A_k = \begin{cases} 0.5I & p=0 \\ I & 1 \le p \le M-1 \end{cases} \quad (101)$$

In view of the above disclosure, it is easy to see that a matrix-valued discrete sine transform (matrix-DST) can be described in a similar fashion. Also note that since the matrix-DCT is a type of matrix-DFT with the advantage of all-real matrix coefficients, it is possible to use a fast matrix-DCT processor and thus reduce the computational complexity and load significantly.

4—Additional Matrix-Valued Transform Methods

The method of the matrix-valued transformation can be further extended to include the other well-known transforms. For example, consider the following matrix-valued version of the discrete Hartley transform $$h_p = \sum_{m=0}^{M-1}\left\{\cos\left[\left(\dfrac{2\pi}{M}\Phi\right)mp\right] + \sin\left[\left(\dfrac{2\pi}{M}\Phi\right)mp\right]\right\}x_m \quad 0 \le p \le M-1 \quad (102)$$

The matrix-valued inverse discrete Hartley transform is given by $$x_m = \dfrac{1}{M}\sum_{p=0}^{M-1}\left\{\cos\left[\left(\dfrac{2\pi}{M}\Phi\right)mp\right] + \sin\left[\left(\dfrac{2\pi}{M}\Phi\right)mp\right]\right\}h_p \quad 0 \le m \le M-1 \quad (103)$$

Clearly, various other matrix-valued transforms can be devised by employing an appropriate kernel function. Consequently, those who are skilled in the art can easily describe the other matrix-valued signal processing transforms such as the matrix-valued Laplace-transform, the matrix-valued z-transform, the matrix-valued Hilbert transform, the matrix-valued Radon transform, the matrix-valued Gabor transform, the matrix-valued Karhunen-Loeve transform, and the matrix-valued Walsh-Hadamard transform.

5—Additional Embodiments of the Fast Matrix-DFT and Fast Matrix-IDFT

The purpose of this section is to describe some typical applications that incorporate the fast matrix-DFT and fast matrix-IDFT technologies. These additional embodiments and ramifications are meant to be illustrative but not comprehensive.

Circular Matrix Convolution: The method of the matrix-DFT can be used to compute the circular convolution associated with discrete-time MIMO systems. Consider a finite length discrete sequence represented by $\{x_m, m=0,1,2,\ldots,M-1\}$ in which each sample $x_m$ is a vector point of dimension $d \times 1$. Now, suppose that another discrete sequence of equal length, $\{y_p, p=0,1,2,\ldots,M-1\}$, is generated according to the following formula $$y_p = \sum_{m=0}^{M-1} C\{(p-m) \bmod M\} x_m \quad p = 0, 1, 2, \ldots, M-1 \quad (104)$$

Each output vector sample $y_p$ is produced by the time reversal of the matrix sequence $\{C_p, p=0,1,2,\ldots,M-1\}$ and its circular shifting to the right. The resulting operation shall be called circular matrix convolution. Note that the sum of the indices of each sample product inside the summation modulo M is equal to the index of the output being calculated by the circular matrix convolution. The M-vector point circular matrix convolution can also be described in matrix form as $$\begin{bmatrix} y_0 \\ y_1 \\ \vdots \\ y_{M-2} \\ y_{M-1} \end{bmatrix} = \begin{bmatrix} C_0 & C_{M-1} & \cdots & C_2 & C_1 \\ C_1 & C_0 & \cdots & C_3 & C_2 \\ \vdots & \vdots & \ddots & \vdots & \vdots \\ C_{M-2} & C_{M-3} & \cdots & C_0 & C_{M-1} \\ C_{M-1} & C_{M-2} & \cdots & C_1 & C_0 \end{bmatrix} \begin{bmatrix} x_0 \\ x_1 \\ \vdots \\ x_{M-2} \\ x_{M-1} \end{bmatrix} \quad (105)$$

It is worth observing that the elements of the matrix sequence $\{C_p, p=0,1,2,\ldots,M-1\}$ have a special structural arrangement. Specifically, each matrix row is obtained by cyclically shifting to the right the previous row with the overflow element being moved to the first position. The compact form of Eq.105 is $$y = Cx \quad (106)$$

where C is a block circulant matrix of dimension $dM \times dM$. Notice that the circulant matrix C of Eq.106 is a hyper-matrix and x and y are hyper-vectors. Circulant matrices have important properties. For a comprehensive treatment of properties of circulant matrices, please refer to [6] "Circulant Matrices", P. H. Davis, John Wiley and Sons, New York, 1979, ISBN 0-471-05771-1, which is incorporated herein by reference.

From the perspective of digital signal processing, the most significant property of a block circulant matrix is the fact that it permits spectral decomposition as given by $$C = W^\perp \Lambda_c W \quad (107)$$

where W is the Fourier transformation matrix of the matrix-DFT algorithm (see Eq.29). The matrix $A_c$ is a block diagonal matrix that contains the matrix-DFT results of the matrix sequence $\{C_p, p=0,1,2,\ldots,M-1\}$ characterizing the circular matrix convolution. Let these matrix-DFT results be denoted by $\{\Lambda_p, p=0,1,2,\ldots,M-1\}$. Then, the hyper-matrix $\Lambda_c$ is given by $$\Lambda_c = \begin{bmatrix} \Lambda_1 & 0 & \cdots & 0 \\ 0 & \Lambda_2 & \cdots & 0 \\ \vdots & \vdots & \ddots & \vdots \\ 0 & 0 & \cdots & \Lambda_{M-1} \end{bmatrix} \quad (108)$$

The spectral diagonalization of C has a natural role in calculating the circular matrix convolution efficiently. Because, after diagonalization, the matrix convolution equation can be written as $$y = W^\perp \Lambda_c W x \text{ or} \tag{109}$$

$$y = W^\perp \Lambda_c z \tag{110}$$

where z=Wx is the matrix-DFT of x. The signal is further processed by multiplying the diagonal matrix and z $$v = \Lambda_c z \tag{111}$$

This yields $$y = W^\perp v \tag{112}$$

Thus, it is seen that the output signal represented by y can be easily determined via a matrix-IDFT. If the matrix-DFT and matrix-IDFT operations are computed using one of the fast matrix-valued algorithms of this invention, then the outcome is an efficient circular matrix convolution algorithm. The above developments can be summarized by $$mDFT\{y\} = \text{diagonal } [mDFT\{C_p\}]mDFT\{x\} \tag{113}$$

In words, the matrix-DFT of the circular matrix convolution of a matrix and a vector-valued sequence is equal to the diagonal-matrix and vector multiplication of the individual matrix-DFTs. Note that this new algorithm is significantly different than what is known in the prior art. First, recall that the circular convolution of the prior art deals exclusively with two scalar sequences. The prior art states that the conventional DFT of a circular convolution of two scalar sequences is the product of the individual DFTs. For example, please see the following reference:

[7] "A Course in Digital Signal Processing" by B. Poraz, John Wiley and Sons, New York, 1997, ISBN 0-471-14961-6, which is incorporated herein by reference.

Linear Matrix Convolution and Correlation: Observe that the circular matrix convolution of M-point matrix and vector sequences yields another M-point vector sequence. On the other hand, a linear matrix convolution of an $M_1$-point matrix sequence with an $M_2$-point vector sequence would produce an $(M_1+M_2-1)$-point vector sequence. But, the circular matrix convolution of matrix and vector-valued sequences, of lengths $M_1$ and $M_2$, respectively, can be made equal to the linear matrix convolution of the two sequences by zero padding both sequences so that they both consists of $(M_1+M_2-1)$ vector points. It is also possible to make use of the circular matrix convolution in the computation of linear matrix correlation just as it is used for linear matrix convolution calculations.

The above disclosure that the matrix-DFTs of matrix and vector-valued sequences can be used to compute their linear matrix convolution and correlation is an important new algorithm for processing signals involving MIMO systems.

Matrix-OFDM and Matrix-DMT: This section describes preferred embodiments of the present invention for wireless and wireline communication systems. The design of a wireless communication system is a very challenging task due to severe multipath propagation, which is the result of multiple scattering by various objects in the vicinity of a mobile station. This scattering produces rapid random amplitude and phase variations in the received signal as the mobile unit moves in the multipath field. The short-term statistics of the resultant signal envelope can be approximated by a Rayleigh distribution.

In a conventional serial data system employing a single carrier, the symbols are transmitted sequentially and the frequency spectrum of each data symbol is allowed to occupy the entire available bandwidth. However, due to the bursty nature of the Rayleigh channel, several adjacent symbols may be completely lost during a fade.

A parallel system overcomes many of the problems encountered with a serial system. In a parallel system, a wideband channel is transformed into a set of sub-channels so that, at any instant, many data elements are being transmitted simultaneously. As a result, spectrum of an individual data element normally occupies only a small part of the available bandwidth.

In the prior art, parallel wireless communication has been achieved by implementing orthogonal frequency division multiplexing (OFDM). Wireline communication systems employ a similar parallel approach, which is called digital multi-tone (DMT) in the prior art. Here, the prior art is described with regard to OFDM based systems. But, it should be understood that a similar discussion also applies to DMT based systems.

A major disadvantage of a parallel system such as the OFDM is its increased complexity in comparison to a serial system. The complexity of an OFDM system can be reduced substantially by using fast Fourier transforms to generate orthogonal waveforms. This approach was first described in the following article:

[8] "Data Transmission by Frequency Division Multiplexing Using the Discrete Fourier Transform" by S. B. Weinstein and P. M. Elbert, IEEE Transactions on Communication Technology, 1971, Vol. COM-19, No.5, pp. 628-634, which is incorporated herein by reference.

In a typical implementation of known OFDM, the user data are first converted from a serial to parallel form and then processed in the transmitter by a scalar-valued IFFT apparatus and in the receiver by a scalar-valued FFT apparatus. For patents of interest concerning the prior art OFDM and DMT technologies, please see U.S. Pat. No. 5,732,068 entitled "Signal Transmitting Apparatus and Signal Receiving Apparatus Using Orthogonal Frequency Division Multiplexing", issued Mar. 24, 1998 to N. Takahashi et al;

U.S. Pat. No. 5,790,514 entitled "Multi-Point OFDM/DMT Digital Communication System Including Remote Service Unit with Improved Receiver Architecture" issued Aug. 4, 1998 to D. J. Marchok et al;

U.S. Pat. No. 5,818,813 entitled "Orthogonal Frequency Division Multiplexing Transmission System and Transmitter and Receiver Adapted to the Same", issued Oct. 6, 1998 to M. Saito and T. Ikeda;

U.S. Pat. No. 5,956,318 entitled "Orthogonal Frequency Division Multiplexing" issued Sep. 21, 1999 to T. Saeki;

U.S. Pat. No. 5,973,642 entitled "Adaptive Antenna Arrays for Orthogonal Frequency Division Multiplexing Systems with Co-Channel Interference", issued Oct. 26, 1999 to Ye Li and N. R. Sullenberger;

U.S. Pat. No. 6,088,398 entitled "Orthogonal Frequency Division Multiplex Systems", issued Jul. 11, 2000 to M. Wahlqvist et al;

U.S. Pat. No. 6,151,295 entitled "OFDM Receiving System", issued Nov. 21, 2000 to Steve Ma et al;

U.S. Pat. No. 6,175,550 entitled "Orthogonal Frequency Division Multiplexing System with Dynamically Scalable Operating Parameters and Method Thereof", issued Jan. 16, 2001 to R. D. J. van Nee;

U.S. Pat. No. 6,304,611 entitled "OFDM Modulator and OFDM Modulation method for Digital Modulated Wave Having Guard Interval", issued Oct. 16, 2001 to A. Miyashita et al, and U.S. Pat. No. 6,404,806 entitled "Method and Apparatus for Time-Domain Equalization in FDM-based Discrete Multi-Tone Modems", issued Jun. 11, 2002 to A. Ginesi et al, all of which are incorporated herein by reference.

FIG. 7 illustrates the components of an exemplary known OFDM communication system. A review of the prior art patents reveals that, without exception, all known OFDM communication systems employ a scalar-valued IFFT apparatus 154 in the transmitter and a scalar-valued FFT apparatus 164 in the receiver.

of this convolution is a vector symbol sequence of length M+K. Finally, let $\{r_p, p=0,1,2, \ldots, M+K-1\}$ denote the discrete-time sequence of the received symbol vector r(t) 230. Note that extension of the channel output sequence by K samples compared to the channel input sequence is due to the inter-symbol interference (ISI) produced by the channel.

To overcome the effect of ISI, a cyclically extended vector-valued guard interval is added. That is, each symbol vector sequence is preceded by a periodic extension of the sequence itself. In other words, a copy of the last K vector samples of the symbol sequence is repeated at the beginning of the vector sequence being transmitted. Symbolically, this is expressed by $\{s_{-k}=s_{M-k}, k=1,2, \ldots, K\}$. This insertion shall be called vector-valued cyclic prefix. In view of the vector-valued cyclic prefix, the matrix-valued description of the communication system takes the following form $$\begin{bmatrix} r_{M-1} \\ r_{M-2} \\ \vdots \\ r_{M-K-1} \\ r_{M-K-2} \\ \vdots \\ r_1 \\ r_0 \end{bmatrix} = \begin{bmatrix} H_0 & H_1 & \cdots & H_{K-1} & H_K & \cdots & 0 & 0 \\ 0 & H_0 & \cdots & H_{K-2} & H_{K-1} & \cdots & 0 & 0 \\ \vdots & \vdots & \ddots & \vdots & \vdots & \ddots & \vdots & \vdots \\ 0 & 0 & \cdots & H_0 & H_1 & \cdots & H_{K-1} & H_K \\ H_K & 0 & \cdots & 0 & H_0 & \cdots & H_{K-2} & H_{K-1} \\ \vdots & \vdots & \ddots & \vdots & \vdots & \ddots & \vdots & \vdots \\ H_2 & H_3 & \cdots & 0 & 0 & \cdots & H_0 & H_1 \\ H_1 & H_2 & \cdots & H_K & 0 & \cdots & 0 & H_0 \end{bmatrix} \begin{bmatrix} s_{M-1} \\ s_{M-2} \\ \vdots \\ s_{M-K-1} \\ s_{M-K-2} \\ \vdots \\ s_1 \\ s_0 \end{bmatrix} + \begin{bmatrix} n_{M-1} \\ n_{M-2} \\ \vdots \\ n_{M-K-1} \\ n_{M-K-2} \\ \vdots \\ n_1 \\ n_0 \end{bmatrix} \quad (114)$$

On the other hand, it is possible to build a communication system using matrix-valued orthogonal frequency division multiplexing (hereafter called matrix-OFDM) by incorporating the matrix-FFT technology of this invention. In contrast to the prior art scalar-valued OFDM system, a matrix-OFDM communication System makes use of a matrix-valued IFFT apparatus in the transmitter and a matrix-valued FFT apparatus in the receiver. Note that matrix-OFDM is also a parallel method.

What makes the matrix-OFDM innovative is the fact that fast matrix-DFT and matrix-IDFT algorithms of the present invention can be used to compute the discrete-time linear matrix convolution associated with MIMO communication systems. Recall that, in a practical situation, a frequency-selective fading MIMO communication channel has its impulse response matrix, H(t), essentially confined to a finite interval $[0, T_h]$, which is equivalent to stating that H(t)=0 for all $t \geq T_h$. Here, it is assumed that H(t) corresponds to the combined effect of transmit filters, transmission channel, and received filters. The matrix-valued FIR model of a frequency-selective fading MIMO channel can be seen in FIG. 8. Now, let the base-band equivalent impulse response matrix of the channel, sampled at a rate of $1/T_s$, be represented by the matrix sequence $\{H_k, k=0,1,2, \ldots, K\}$ 210. The sampling rate is chosen to be greater than twice the highest frequency component of interest in accordance with the well-known sampling theorem. Moreover, suppose that $\{s_m, m=0,1,2, \ldots, M-1\}$ denotes the discrete-time sequence of the transmitted symbol vector s(t) 200. Also, let $\{n_m, m=0, 1,2, \ldots, M-1\}$ represent the discrete-time sequence of the additive channel noise vector n(t) 220. While propagating to the receiver, the transmitted symbol vector sequence of length M is subject to a linear matrix convolution due to the presence of the MIMO communication channel. The result Equivalently, the compact form of the above expression is $$r = Hs + n \quad (115)$$

Clearly, the channel hyper-matrix H is seen to be a block circulant matrix. Thus, the vector-valued cyclic prefix serves not only as a guard space against ISI but also as a tool to convert the linear matrix convolution with the channel time response into a cyclic matrix convolution. Therefore, the channel matrix can be diagonalized in the form given by $H = W \perp \Lambda_h W$. With this observation of the channel matrix on hand, a new hyper-vector is introduced $$a = Ws \quad (116)$$

Note that a is the frequency-domain representation of the transmitted symbols. Each element of a can be viewed as a complex-valued vector point in a multi-dimensional QAM signal constellation. At the receiving end, the received base-band waveforms are match-filtered and sampled at a rate of 1/T. Given the channel output vector r and noise vector n, their corresponding frequency-domain representations become b=Wr and c=Wn, respectively. Hence, Eq. 115 becomes $$b = \Lambda_h a + c \quad (117)$$

After removing those vector-valued samples in guard intervals, the channel input-output relationship can be rewritten as $$b_p = \Lambda_p a_p + c_p$$

$$p = 0, 1, 2, \ldots, M-1 \quad (118)$$

In the case of frequency-selective fading MIMO channels with additive noise, the above expression indicates that the matrix-OFDM receiver is composed of a set of independent matrix processors operating in parallel. If the channel impulse response is perfectly known, the matrix-OFDM receiver would make its decision based on the maximum likelihood (ML) statistics as given by $$a_p = \Lambda_p^{-1} b_p$$

$$p = 0, 1, 2, \ldots, M-1 \quad (119)$$

In practice, the true channel impulse response is not known. Hence, the matrix-OFDM receiver must be implemented by using an estimate of the channel state via pilot symbols.

Now, a structure for the transmitter side of one exemplary matrix-OFDM communication system is described. Referring to FIG. 9, input data from a plurality of sources are coded into bits and modulated by a predetermined modulation technique such as QPSK, 8PSK, 16QAM or 64QAM. These operations are summarized under the coder and modulator apparatus 300. Next, a serial-to-parallel vectors converter 310 reads in the modulated symbols and holds their values at the parallel vector lines thereby splitting the multiple streams of serial data into parallel vector-valued data streams. The blocks of parallel vector-valued samples are then input into a matrix-IFFT processor 320. Next, a vector cyclic-prefix adder 330 is used to insert a vector-valued guard interval into the results coming out of the matrix-FFT processor. A matrix-valued transmit filter 340 is then utilized to filter out unwanted frequency distortions. The output of the filter is changed back into multiple streams of serial data by employing a parallel vectors-to-serial converter 350. The resulting multiple streams of serial data are first converted into the analog domain and then up-converted to an appropriate RF carrier frequency and finally launched into the channel by using a transmit apparatus 360 with a plurality of antennas.

Now, a structure for the receiver side of one exemplary matrix-OFDM communication system is described. Referring to FIG. 10, the incoming RF signals are first down-converted to the baseband-wave form and then converted from analog to digital domain at the receiver apparatus 400 employing a plurality of antennas. Next, a serial-to-parallel vector converter 410 reads in these digital signals and holds their values at the parallel vector lines thereby splitting the received multiple streams of serial data into parallel vector-valued data streams. A vector cyclic-prefix remover apparatus 420 is then used to eliminate the vector-valued guard interval. The resulting vector-valued parallel samples are input into a matrix-valued receive filter 430 to filter out undesired signal and interference noise. The blocks of parallel vector-valued samples are fed into a matrix-FFT processor 440. Next, a matrix-valued equalizer 450 is employed to remove the effects of the transmission channel. The output of the equalizer is converted back into multiple streams of serial data by utilizing a parallel vector-to-serial converter 460. Finally, data bits are restored to their original forms through demodulating, detecting, and decoding processes at a detector and decoder apparatus 470. Note that this exemplary matrix-OFDM system is described in terms of a plurality of transmit and receive antennas. Therefore, a single transmit and receive antenna system is to be considered within the scope of the described invention.

The matrix-OFDM system has the advantage of spreading out a fade over many vector symbols. This effectively randomizes the burst errors caused by the Rayleigh fading, so that instead of several adjacent symbols being completely destroyed, many symbols are only slightly distorted. This allows precise reconstruction of a majority of the distorted symbols. The matrix-OFDM system has the additional advantage of spreading out the total signaling interval, thereby reducing the sensitivity of the system to delay spread.

As discussed earlier, the prior art OFDM is implemented via a scalar-valued DFT/IDFT pair to convert the transmission channel into parallel sub-channels. Recall that the N-point scalar-valued DFT is equal to the Fourier transform of the signal at discrete frequencies given by $$f_k = \frac{k}{N}, \quad 0 \le k \le N-1.$$

Hence, the N-point scalar-valued DFT corresponds to N frequency-domain points. When a prior art communication system implements OFDM, for example, using a 64-point scalar-valued DFT, it has no choice but to occupy a bandwidth of 64 distinct frequency points centered around the carrier frequency. Due to this fact, the prior art OFDM has a rigid structure when it comes to the frequency spacing and its range.

On the other hand, the matrix-OFDM system employs the matrix-FFT and IFFT processors and therefore it inherits a degree of flexibility in specifying the frequency domain parameters. Given a fixed length input data sequence, the matrix-OFDM system is able to control the spacing of frequency points through the eigenvalues of the frequency-weighting matrix $\Phi$ of the matrix-DFT algorithm. For example, consider a 2×2 dimensional frequency-weighting matrix. Without any loss of generality, a diagonal form of $\Phi$ is assumed here to expose the inner workings of the matrix-OFDM. Set $$\Lambda_\Phi = \begin{bmatrix} \lambda_1 & 0 \\ 0 & \lambda_2 \end{bmatrix} = \begin{bmatrix} 1 & 0 \\ 0 & 1 \end{bmatrix} \quad (120)$$

If there are 64 data points, then the number of vector points is simply M=32 because M=N/2. As the matrix-DFT indices vary, $0 \le p \le 32$ and $0 \le m \le 32$, the first and the second eigenvalues generate 32 distinct frequency-domain points. Consequently, the range of the frequency spectrum has been made 50% shorter than the one computed by the scalar-valued DFT. In other words, due to frequency reuse, the matrix-OFDM compresses the time-domain information into a smaller bandwidth resulting in higher spectral efficiency.

Another advantage of the matrix-OFDM comes from the eigenvectors of the frequency-weighting matrix $\Phi$ of the matrix-DFT algorithm. The signal processing function of the eigenvectors is to encode each transmitted symbol in all frequency tones. This means that each sub-carrier contains a known combination of all transmitted symbols. Since the power of each data bit is spread to all sub-carriers, the matrix-OFDM systems are resilient to narrowband interference and channel impairments. In contrast, only one symbol is assigned to each sub-carrier in the prior art OFDM system.

The matrix-OFDM is one particular form of parallel communication system. Another closely related form is the matrix-valued discrete multitone system (or matrix-DMT). Whereas the matrix-OFDM is used for data transmission over radio broadcast channels and wireless communication channels, the matrix-DMT system is utilized in the transmission of data over two-way wireline channels such as asymmetric digital subscriber lines (ADSL) using twisted pairs. Unlike one-way communication, it is feasible for the transmitter of an ADSL system to know the channel characteristics. Thus, practical implementations of the matrix-DMT system can include an optimum loading-algorithm for bit allocation.

It is to be understood that the above-described embodiments are merely illustrative of the invention disclosed herein and that many variations may be devised and created by those skilled in the art without departing from the spirit, scope and essential characteristics of the invention. For example, the matrix-valued methods and algorithms have been described for the matrix-OFDM in the case of wireless communications and the matrix-DMT in the case of wireline communications. Similarly, a matrix-valued embodiment can be easily described for optical communication systems involving dense wavelength division multiplexing (DWDM) technique. It is therefore intended that such variations be also included within the scope of the claims and their equivalents.

Illustrative Hardware Used in Embodiments: For clarity of explanation, illustrative embodiments of the current invention have been described in terms of processors executing matrix and vector-valued algorithms. As known in the art, the operations that these algorithms represent may be provided through the use of either shared or dedicated hardware, including, but not limited to, hardware capable of executing software. Practical embodiments may encompass digital signal processor (DSP) hardware and software performing the operations disclosed herein. Very large scale integration (VLSI) hardware embodiments of the present invention such as field programmable gate arrays (FPGA) and application specific integrated circuits (ASIC) as well as hybrid DSP/VLSI embodiments may also be utilized.

APPENDIX

I. Test Mat FFT2
```
% Input may have multiple columns
function [X]=M FFT2(V,nd,Nop,T)
    [tm, tn]=size (T);
    [vm,vn]=size (V);
    A=zeros(vm,vn);
    nn=0;
    Ti=inv(T);
    while (nn<Nop) % Number of points
        A(nn+1:nn+tn,:)=Ti*V(nn+1:nn+tn,:);
        nn=nn+tn;
    end
for p=1:nd % nd=number of columns of the input
    Z=A(:,p);
    [F]=Matrix Np FFT2(Z);
    X(:,p)=F;
end
```

II. M-FFT2
```
% Input may have multiple columns
function [A]=M IFFT2(V,nd,Nop,T)
    [tm,tn]=size (T);
    [vm,vn]=size(V);
    A=zeros(vm,vn)
    for p=1:nd % number of columns of the input
        Z=V(:,p);
        [F]=Matrix Np IFFT2(Z);
        X(:,p)=F;
    end
    nn=0;
    while (nn<Nop) % Number of points
        A(nn+1:nn+tn,:)=T*X(nn+1:nn+tn,:);
        nn=nn+tn;
    end
```

III. M IFFT2
```
% Subfunction for matrix-FFT
    function [Z]=Matrix Np FFT2(x)
        ng=length(x);
        N p=ng/2; % number of vector points, M
        Z=zeros(ng, 1)
        if (N p==2
            % two-point matrix FFT
            [Z]=Matrix 2p FFT2(x); % call sub function below
            return
        else % if not 2-point problem continue
        % separate into tracks
        xr=reshape(x, [2,N p]); %
        kk=1;
        for k=1:2:N p
            ge(:,kk)=xr(:,k);
            go(:,kk)=xr(:,k+1);
            kk=kk+1;
        end
        xe=reshape(ge, [N p,1]);
        xo=reshape(go, [N p,1]);
        [Fe]=Matrix Np FFT2 (xe);
        [Fo]=Matrix Np FFT2 (xo);
        end
        w=-i*2*pi/(N p);
        W=zeros(2,1);
        W(1,1)=1*w;
        W(2,1)=1*w;
        Np2=(length(Fe))/2;
        Ye=reshape(Fe, [2,Np2]); % reshape for matrix butterfly
        Yo=reshape(Fo, [2,Np2]);
        for k=0:Np2-1
        Wk=exp(W.*k); % 2-element twiddle factor
        Ve(:,k+1)=Ye(:,k+1)+Wk.*Yo(:,k+1); % matrix butterfly
        Vo(:,k+1)=Ye(:,k+1)-Wk.*Yo(:,k+1);
        end
        Ze=reshape(Ve, [2*Np2,1]);
        Zo=reshape(Vo[2*Np2,1]);
        Z=[Ze; Zo]; % combine
    function [F]=Matrix 2p FFT2(x)
        mg=length(x);
        mg2=mg/2;
        F=zeros(mg,1);
        F(1:mg2)=x(1:mg2)+x(mg2+1:mg); % zero component
        F(mg2+1:mg)=x(1:mg2)-x(mg2+1:mg); % one component
```

IV. Matrix Np FFT2
```
    function [Z]=Matrix Np IFFT2(x)
        % main function
        [Z]=Mat Np IFFT2(x); % call subfunction below
        ng=length(x);
        N p=ng/2; % number of vector points, M
        Z=Z./N p;
    % Subfunction for matrix-IFFT
    function [Z]=Mat Np IFFT2(x)
        ng=length(x);
        N p=ng/2; % number of vector points, M
        Z=zeros(ng,1);
```

```
    if (N p==2
    % two-point matrix DFT
        [Z]=Mat 2p IFFT2(x); % this subfunction is below
        return
    else
    % separate into tracks
    xr=reshape(x, [2,N p]); % 2-element blocks
    kk=1;
    for k=1:2:N p %
        ge(:,kk)=xr(:,k); %
        qo(:,kk)=xr(:,k+1); %
        kk=kk+1;
    end
    xe=reshape(ge, [N p,1]);
    xo=reshape(go, [N p,1]);
    [Fe]=Mat Np IFFT2(xe);
    [Fo]=Mat Np IFFT2 (xo);
    end
    w=i*2*pi/(N p);
    W=zeros(2,1); % 2-element transform
    W(1,1)=1*w;
    W(2,1)=1*w;
    Np2=(length(Fe))/2;
    Ye=reshape (Fe, [2,Np2]);
    Yo=reshape(Fo, [2,Np2]);
    for k=0:Np2-1
    Wk=exp(W.*k);
    Ve(:,k+1)=Ye(:,k+1)+Wk.*Yo(:,k+1);
    Vo(:,k+1)=Ye(:,k+1)−Wk.*Yo(:,k+1);
    end
    Ze=reshape(Ve, [2*Np2,1]);
    Zo=reshape(Vo, [2*Np2,1]);
    Z=[Ze; Zo];
function [F]=Mat 2p IFFT2(x)
    mg=length(x);
    mg2=mg/2;
    F=zeros(mg,1);
    F(1:mg2)=x(1:mg2)+x(mg2+1:mg); % zero component
    F(mg2+1:mg)=x(1:mg2)−x(mg2+1:mg); % one component V. Matrix Np IFFT2
% Test file for Matrix-FFT and IFFT
Nop=16; % Number of data points
    rand('seed',1);
m1=rand(Nop,1)>0.5; % generate random data of 1s and 0s.
N p=length(m1)
v1=zeros(N p,1);
ze=zeros(N p,1);
zo=ze;
% T is the similarity transformation matrix.
% T=[0.2898 0.9571; −0.9571 0.2898];
    T=[1 1; 1 −1];
% T=eye(2,2);
v1=m1;
    [Z]=M FFT2(v1,1,N p,T) % on the input: one column of
    complex data
    [F]=M IFFT2(Z,1,N p,T);
% error calculations
    err=m1−F;
    total e=sum(err) % total error
```

I claim:

1. A matrix-valued method for processing vector-valued symbol sequences represented by $\{s_m, m=0,1,2,\ldots,M-1\}$ and vector-valued orthogonal frequency division multiplexed signals generated by a matrix-valued IFFT operation, said method comprising the steps of:
   (a) performing a matrix-valued IFFT transform calculation on the vector-valued sequence $\{s_m, m=0,1,2,\ldots,M-1\}$ and thereby obtaining a first vector-valued and orthogonal frequency division multiplexed sequence $\{a_m, m=0,1,2,\ldots,M-1\}$;
   (b) adding a cyclically extended guard interval wherein each symbol vector sequence is preceded by a periodic extension of the sequence itself and thereby obtaining a second vector-valued sequence;
   (c) transmitting the second vector-valued sequence of step 24.(b), on a radio frequency (RF) carrier, from one or more transmission antennas;
   (d) receiving, at one or more receive antennas, radio frequency (RF) signals from one or more transmission antennas of step 24.(c);
   (e) removing those samples in guard intervals and demodulating the received signals of step 24.(d) to obtain a third vector-valued base-band sequence represented by $\{b_m, m=0,1,2,\ldots,M-1\}$;
   (f) estimating a first base-band equivalent channel impulse response matrix sequence represented by $\{H_k, k=0,1,2,\ldots,M-1\}$;
   (g) performing a matrix-valued FFT calculation on the first matrix sequence $\{H_k, k=0,1,2,\ldots,M-1\}$ of step 24.(f) and thereby obtaining a second matrix-valued sequence $\{\Lambda_p, p=0,1,2,\ldots,M-1\}$;
   (h) solving the set of matrix-vector equations represented by $\hat{a}_p = \Lambda_p^{-1} b_p, p=0,1,2,\ldots,M-1$ and thereby obtaining a fourth vector-valued sequence $\{\hat{a}_p, p=0,1,2,\ldots,M-1\}$;
   (i) performing a matrix-valued FFT calculation on the fourth vector-valued symbol sequence $\{\hat{a}_p, p=0,1,2,\ldots,M-1\}$ of step 24.(h) and thereby obtaining a fifth vector-valued sequence $\{\hat{x}_m, m=0,1,2,\ldots,M-1\}$; and
   (j) subjecting the fifth vector-valued sequence $\{\hat{x}_m, m=0,1,2,\ldots,M-1\}$ of step 24.(i) to a decision process and thereby recovering an estimated sequence $\{\hat{s}_m, m=0,1,2,\ldots,M-1\}$ of the original vector-valued input symbol sequence.

2. A communication system having vector-valued and orthogonal frequency division multiplexed signals generated by a matrix-valued IFFT apparatus, said communication system comprising:
   (a) a coder and modulator apparatus for coding and modulating the incoming serial data by a predetermined modulation technique;
   (b) a serial-to-parallel vectors converter module for splitting the multiple streams of serial data into parallel vector-valued data streams;
   (c) a matrix-IFFT processor for performing a matrix-valued IFFT operation on the vector-valued data streams of step 25.(b);
   (d) a cyclically extended guard interval adder for repeating a copy of a predetermined number of vector samples of the symbol sequence at the beginning of the vector sequence being transmitted;
   (e) a matrix-transmit filter module for filtering out the unwanted noise and frequency distortions;
   (f) a parallel vectors-to-serial converter module for generating multiple streams of serial data;
   (g) a transmitter for converting the digital data streams into the analog domain and then up-converting the analog signals to an appropriate RF carrier frequency and launching the resulting signals from a plurality of transmission antennas;

(h) a receiver for collecting transmitted RF signals at a plurality of receive antennas and for down-converting the RF signals to the baseband-wave form and then converting the signals from analog to digital domain;

(k) a serial-to-parallel vectors converter module for reading in said digital signals and holding their values at the parallel vector lines thereby splitting the received multiple streams of serial data into parallel vector-valued data streams;

(m) a vector cyclic-prefix remover module for eliminating the vector samples in guard intervals;

(n) a matrix-valued receive filter module to filter out undesired signal and interference noise;

(p) a matrix-FFT processor for performing a matrix-valued transform operation;

(q) a matrix equalizer module for estimating a base-band equivalent matrix-valued impulse response of the transmission channel and for removing the effects of the transmission channel;

(r) a parallel vectors-to-serial converter module for converting parallel vector-valued data streams back into multiple streams of serial data; and (s) a detector and decoder apparatus for demodulating, detecting, and decoding and thereby restoring said serial data bits to their original forms.

3. A digital image, video, and music coding and decoding (CODEC) system having vector-valued data sequence generated by a matrix-valued discrete cosine transform method, said CODEC system comprising:

(a) a serial-to-parallel vectors converter module for splitting the multiple streams of source data into parallel vector-valued data streams;

(b) a processor for performing a matrix-valued discrete cosine transform operation;

(c) a quantizer module to remove the components of the transformed data not affecting the final result;

(d) a processor for performing a matrix-valued inverse discrete cosine transform operation; and (e) a parallel vectors-to-serial converter module for converting parallel vector-valued data streams back into multiple streams of serial data.

* * * * *